(12) United States Patent
Jaroszczyk et al.

(10) Patent No.: US 7,097,694 B1
(45) Date of Patent: Aug. 29, 2006

(54) HIGH PERFORMANCE, HIGH EFFICIENCY FILTER

(75) Inventors: Tadeusz Jaroszczyk, Stoughton, WI (US); Stephen L. Fallon, Madison, WI (US); Byron A. Pardue, Cookeville, TN (US); Kelly R. Schmitz, Rockton, IL (US); Jason E. Dorgan, Madison, WI (US); Thomas P. Sonsalla, Stoughton, WI (US); Jerald J. Moy, Oregon, WI (US); Jeffrey S. Morgan, Stoughton, WI (US); Kent J. Kallsen, Jefferson, WI (US)

(73) Assignee: Fleetguard, Inc., Nashville, TN (US)

( * ) Notice: Subject to any disclaimer, the term of this patent is extended or adjusted under 35 U.S.C. 154(b) by 70 days.

(21) Appl. No.: 10/728,311

(22) Filed: Dec. 4, 2003

(51) Int. Cl.
*B03C 3/011* (2006.01)

(52) U.S. Cl. .............................. 96/17; 55/486; 55/521; 96/57; 96/58; 210/493.1; 210/493.5; 977/DIG. 1

(58) Field of Classification Search .............. 55/521, 55/527–528, 497–498, 486–489; 96/17, 96/57–58; 210/493.1, 493.5; 977/DIG. 1
See application file for complete search history.

(56) References Cited

U.S. PATENT DOCUMENTS

| | | | |
|---|---|---|---|
| 4,323,374 A | 4/1982 | Shinagawa et al. | |
| 4,344,776 A | 8/1982 | Yavnieli | |
| 4,357,150 A | 11/1982 | Masuda et al. | |
| 4,606,743 A | 8/1986 | Shuman | |
| 4,626,263 A | 12/1986 | Inoue et al. | |
| 4,650,506 A | 3/1987 | Barris et al. | |
| 4,657,639 A | 4/1987 | Mahadevan et al. | |
| 4,917,942 A | 4/1990 | Winters | |
| 4,926,053 A | 5/1990 | Dempsey et al. | |
| 4,978,372 A | 12/1990 | Pick | |
| 5,037,455 A | 8/1991 | Scheineson et al. | |
| 5,096,472 A | 3/1992 | Perry | |
| 5,238,474 A | 8/1993 | Kahlbaugh et al. | |
| 5,304,227 A | 4/1994 | Matsuura et al. | |
| 5,350,443 A | 9/1994 | Von Blücher et al. | |
| 5,419,953 A | 5/1995 | Chapman | |
| 5,423,892 A | 6/1995 | Kahlbaugh et al. | |
| 5,454,858 A | 10/1995 | Tokar et al. | |
| 5,474,599 A | 12/1995 | Cheney et al. | |
| 5,501,716 A | 3/1996 | Chiba et al. | |
| 5,547,756 A | 8/1996 | Kamo et al. | |
| 5,556,522 A | 9/1996 | Ingalls et al. | |
| 5,622,537 A | 4/1997 | Kahlbaugh et al. | |
| 5,626,650 A | 5/1997 | Rodriguez et al. | |
| 5,656,242 A | 8/1997 | Morrow et al. | |
| 5,669,949 A | 9/1997 | Dudrey et al. | |
| 5,714,067 A | 2/1998 | Sorrick | |
| 5,721,180 A | 2/1998 | Pike et al. | |
| 5,726,107 A | 3/1998 | Dahringer et al. | |
| 5,766,288 A | 6/1998 | Thiele et al. | |

(Continued)

OTHER PUBLICATIONS

*The Separation of Airborne Dust and Particles*, C. N. Davies, Proceedings, Institute of Mechanical Engineers, vol. 113, (5), 1952, pp. 185-213.

(Continued)

*Primary Examiner*—Richard L. Chiesa
(74) *Attorney, Agent, or Firm*—Andrus, Sceales, Starke & Sawall, LLP

(57) ABSTRACT

A high performance, high efficiency filter is provided by a multi-stage filter having combinations of tribologically different fibers, nanofibers, and layering.

6 Claims, 13 Drawing Sheets

U.S. PATENT DOCUMENTS

| | | | |
|---|---|---|---|
| 5,792,227 A | 8/1998 | Kahlbaugh et al. | |
| 5,792,242 A | 8/1998 | Haskett | |
| 5,800,587 A | 9/1998 | Kahlbaugh et al. | |
| 5,871,836 A * | 2/1999 | Schultink et al. | 428/181 |
| 5,871,845 A | 2/1999 | Dahringer et al. | |
| 5,873,968 A | 2/1999 | Pike et al. | |
| 5,888,274 A * | 3/1999 | Frederick | 95/59 |
| 5,964,926 A | 10/1999 | Cohen | |
| 5,979,030 A | 11/1999 | Legare | |
| 6,010,458 A * | 1/2000 | Roberts | 600/529 |
| 6,048,614 A | 4/2000 | Rohrbach et al. | |
| 6,056,809 A | 5/2000 | Chapman | |
| 6,123,752 A | 9/2000 | Wu et al. | |
| 6,149,700 A | 11/2000 | Morgan et al. | |
| 6,155,432 A * | 12/2000 | Wilson et al. | 210/505 |
| 6,156,086 A | 12/2000 | Zhang | |
| 6,162,535 A * | 12/2000 | Turkevich et al. | 428/372 |
| 6,190,432 B1 * | 2/2001 | Gieseke et al. | 55/385.3 |
| 6,197,096 B1 | 3/2001 | Cartellone | |
| 6,211,100 B1 | 4/2001 | Legare | |
| 6,261,342 B1 | 7/2001 | Rousseau et al. | |
| 6,315,805 B1 | 11/2001 | Strauss | |
| 6,368,386 B1 | 4/2002 | Nelson et al. | |
| 6,372,004 B1 | 4/2002 | Schultink et al. | |
| 6,375,700 B1 | 4/2002 | Jaroszczyk et al. | |
| 6,387,144 B1 | 5/2002 | Jaroszczyk et al. | |
| 6,402,951 B1 * | 6/2002 | Wilson et al. | 210/500.25 |
| 6,482,247 B1 | 11/2002 | Jaroszczyk et al. | |
| 6,511,599 B1 | 1/2003 | Jaroszczyk et al. | |
| 6,514,324 B1 * | 2/2003 | Chapman | 96/67 |
| 6,673,136 B1 * | 1/2004 | Gillingham et al. | 95/273 |
| 6,716,274 B1 * | 4/2004 | Gogins et al. | 95/273 |
| 6,800,117 B1 * | 10/2004 | Barris et al. | 95/273 |
| 6,872,311 B1 * | 3/2005 | Koslow | 210/502.1 |
| 6,875,256 B1 * | 4/2005 | Gillingham et al. | 95/273 |
| 2003/0037675 A1 * | 2/2003 | Gillingham et al. | 95/280 |
| 2003/0217534 A1 * | 11/2003 | Krisko et al. | 55/337 |

OTHER PUBLICATIONS

*Fundamentals of Air Pollution Engineering*, R. C. Flagan and J.H. Seinfeld, Prentice Hall, Inc., Englewood Cliffs, NJ, 1988, p. 436.

*Experimental Study of Non-Woven Filter Performance Using Second Order Orthogonal Design*, T. Jaroszczyk, Part. Sci. & Technol., vol. 5, pp. 271-287, 1987.

\* cited by examiner

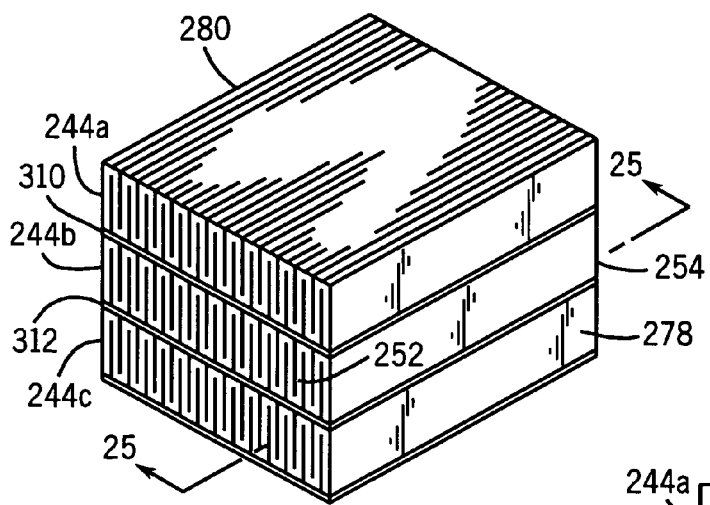
FIG. 24
FIG. 25 (PRIOR ART)
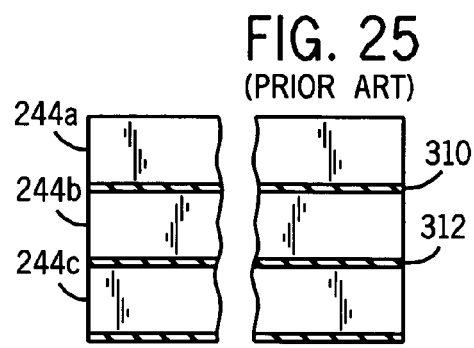
FIG. 26 (PRIOR ART)
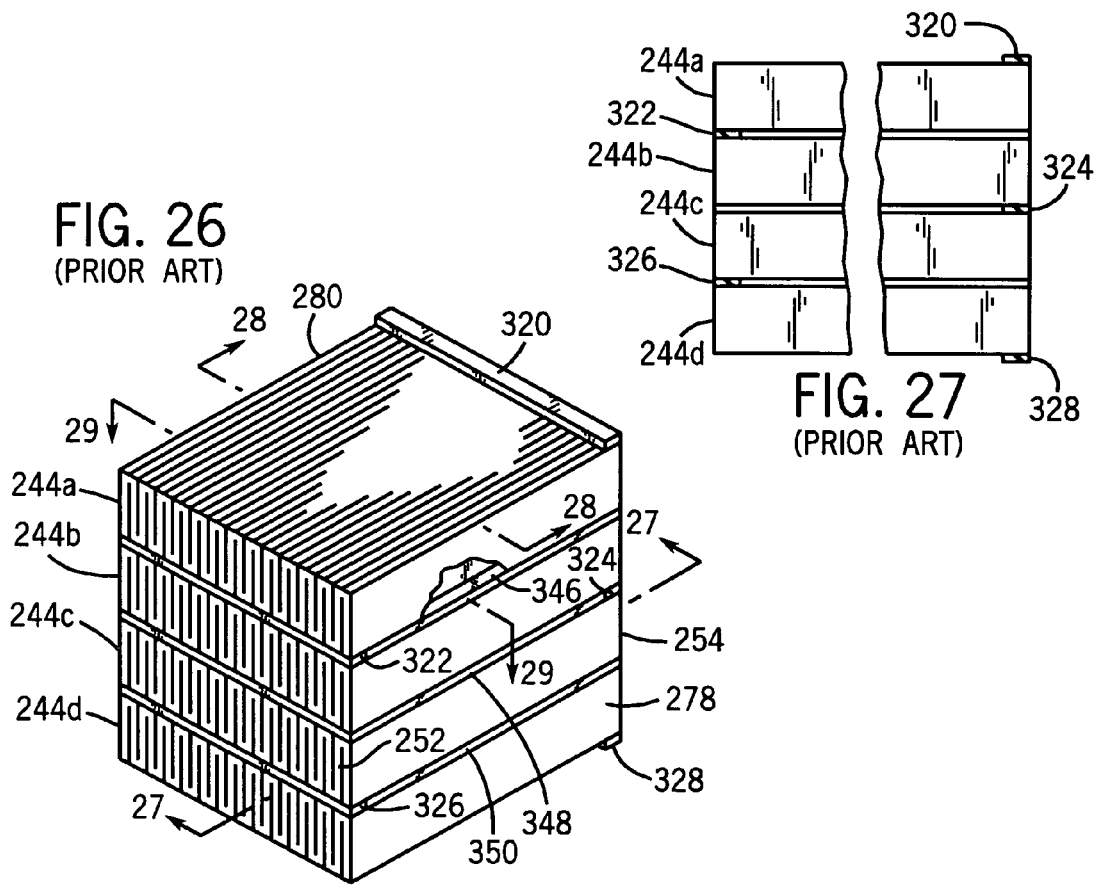
FIG. 27 (PRIOR ART)

HIGH PERFORMANCE, HIGH EFFICIENCY FILTER

BACKGROUND AND SUMMARY

The invention relates to high performance, high efficiency filters.

There are ever increasing demands for higher performance, higher efficiency filters, all within a compact passage. The present invention arose during development efforts directed toward these demands. The present invention achieves higher performance and efficiency with various filter combinations including multi-stage filters, direct flow filters, and filters employing nanofibers in a selected fiber diameter range, basis weight range, layering, and placement.

BRIEF DESCRIPTION OF THE DRAWINGS

FIG. 1 is a schematic perspective view of fibrous non-woven filter media.

FIG. 2 is a schematic illustration of the forming process for the media of FIG. 1.

FIG. 3 is an enlarged view of section 3—3 of FIG. 2.

FIG. 4 is an enlarged sectional view of a portion of the media of FIG. 1, after needling.

FIG. 5 is a sectional view of fibrous non-woven filter media.

FIG. 6 is an enlarged view of section 6—6 of FIG. 5.

FIG. 7 is an enlarged schematic sectional view of fibrous non-woven filter media with flow direction orientation.

FIG. 8 is an illustration like FIG. 7 and shows an alternate embodiment.

FIG. 9 illustrates filter media construction.

FIG. 10 is an enlarged view of section 10—10 of FIG. 9.

FIG. 11 shows an extended life two stage fluid filter assembly.

FIG. 12 is an enlarged view of section 12—12 of FIG. 11.

FIG. 13 shows another embodiment of an extended life two-stage fluid filter assembly.

FIGS. 18–32 are taken from U.S. Pat. No. 6,375,700, incorporated herein by reference.

FIG. 18 is an exploded perspective view of a filter.

FIG. 19 is a sectional view taken along line 19—19 of FIG. 18.

FIG. 20 is a sectional view of a portion of the filter of FIG. 18 in assembled condition.

FIG. 21 is a perspective view similar to a portion of FIG. 18 and shows an alternate embodiment.

FIG. 22 is an exploded perspective view of an alternate embodiment.

FIG. 23 is like FIG. 21 and shows another embodiment.

FIG. 24 is similar to FIG. 23 and illustrates sealing between elements.

FIG. 25 is a sectional view taken along line 25—25 of FIG. 24.

FIG. 26 is like FIG. 24 and shows another embodiment.

FIG. 27 is a sectional view taken along line 27—27 of FIG. 26.

FIG. 28 is a sectional view taken along line 28—28 of FIG. 26.

FIG. 29 is a sectional view taken along line 29—29 of FIG. 26.

FIG. 30 is similar to FIGS. 21, 23, 24, 26, and further illustrates sealing.

FIG. 31 is an elevational view of the front or upstream side of the filter of FIG. 30.

FIG. 32 is an elevational view of the back or downstream side of the filter of FIG. 30.

DETAILED DESCRIPTION

PRIOR ART

Figure 1:
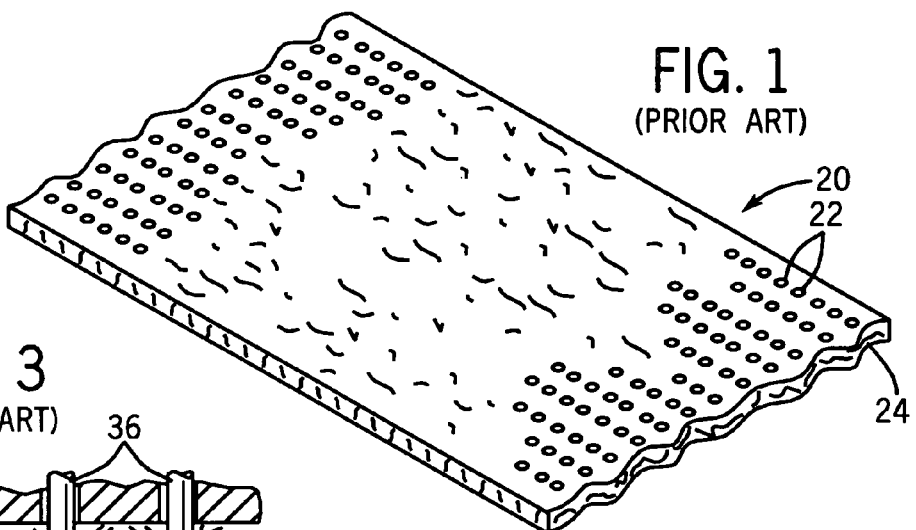
FIGS. 1–13 are taken from U.S. Pat. No. 6,387,144, incorporated herein by reference.
Figure 3:
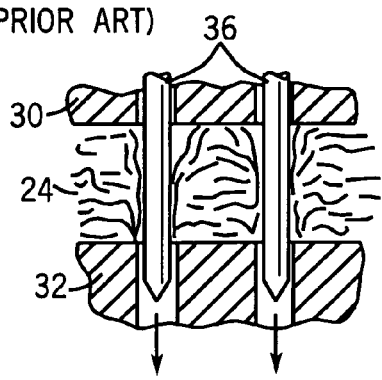
Figure 2:
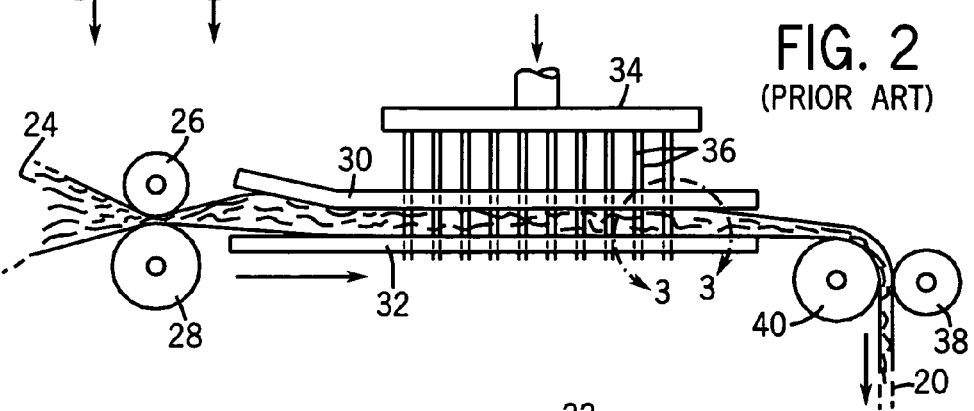
Figure 4:
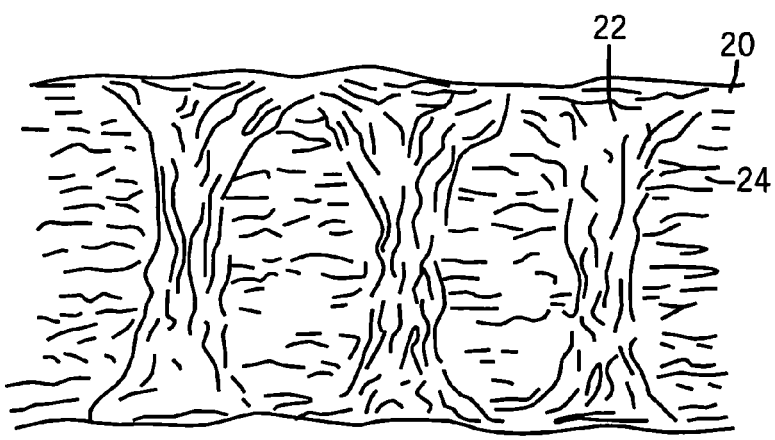

FIG. 1 shows a sheet of non-woven fibrous filter material 20 known in the prior art. Non-woven materials typically use needling techniques to achieve desired media thickness and solidity. During the process of needling, small holes 22 are formed thorough the media. As shown in FIG. 2, synthetic or felted fiber media 24 is fed between rollers 26 and 28 and then between platens 30 and 32 which hold the material in place during downward movement of mandrel 34 having a plurality of lower downwardly extending needles 36 which punch through material 24, FIG. 3, to form the noted needle holes 22, FIG. 4, whereafter the needled sheet is fed through exit rollers 38 and 40. While needling is desirable to hold the non-woven fibrous media together and achieve desired media thickness and solidity, a disadvantage is that the needle holes present discontinuities in the filtering media because they are relatively large pores as compared to the bulk fiber matrix. The large pores offer a path of low resistance to fluid flow, such as air. Because smaller pores of the remaining bulk fiber matrix are clogged faster by contaminant particles such as dust, the velocity through the larger needle holes 22 increases correspondingly, as in a venturi. Consequently, both uncaptured and detached reentrained contaminant particles can penetrate the filter through such needle holes 22, causing lower filter efficiency.

Figure 5:
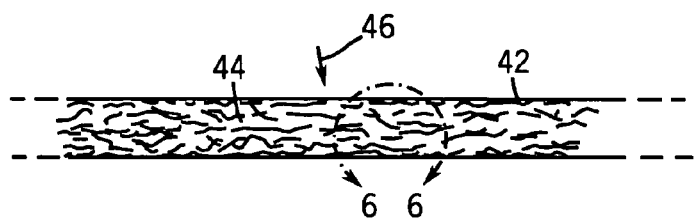
Figure 6:
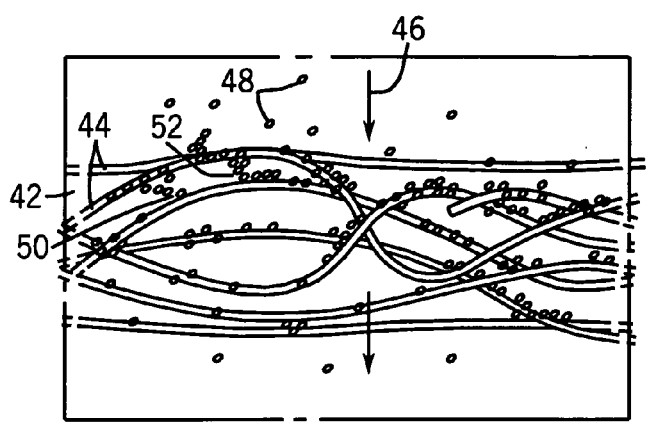

FIG. 5 shows filter material 42 of non-woven fibrous filter media as known in the prior art, which may or may not be needled. The fibers 44 in the sheet run predominantly along or parallel to the sheet, i.e. horizontally left-right in the orientation of FIG. 5, and perpendicular to the direction of fluid flow as shown at arrow 46, FIGS. 5 and 6. The surface area of the fibers available for adhesion and capture of contaminant particles 48 is perpendicular to fluid flow direction 46. Contaminant particles will aggregate on each other for example as shown at aggregate 50, and will also form particle bridges between fibers for example as shown at 52. Contaminant particle aggregates and bridges block flow and shorten filter life by leading to premature restriction and pressure drop. Furthermore, if filter media sheet 42 is needled, the larger pores provided by needle holes 22 offer the noted path of lower restriction and higher velocity, particularly due to faster clogging of smaller pores at adjacent areas between the needle holes, particularly at aggregates 50 and bridges 52. Consequently, as above noted, both uncaptured and detached reentrained contaminant particles can penetrate the filter through the needle holes. The contaminant particle aggregates and bridges in areas between needle holes are further subject to instability and reentrainment if exposed to high flow rates or pulsation, for example at the beginning of filter operation, such as at start-up of an internal combustion engine and the initial high air flow rate through the air filter therefor, and also due to the high velocity venturi effect of flow through needle holes 22 if the media is needled.

In the invention of the incorporated '144 patent, a simple and effective solution is provided for the above-noted and other problems. The '144 invention provides a method of filtering particles in a fluid flowing along flow direction 46, FIG. 7, through filter media 60 having a plurality of fibers 62. The improved method increases capture of and retention of contaminant particles 64 by fibers 62 by increasing residence dwell time of particles moving along the fibers to increase the chance of, and extend the time of, fiber-particle contact, increasing Brownian diffusion probability of particles diffusing to the fibers, increasing the spread of, and even loading of, particles along the fibers, and reducing particle agglomeration and particle bridging between fibers which would otherwise block flow and be subject to instability and reentrainment if exposed to high flow rates or pulsation. The increased residence dwell time, increased Brownian diffusion, increased spread and evenness of particle loading, and reduced particle agglomeration and bridging, are all accomplished simply by orienting fibers 62 dominantly parallel to flow direction 46 in combination with providing fibers 62 of sufficient length along flow direction 46 such that residence dwell time is increased, Brownian diffusion is increased, spread and evenness of particle loading is increased, and particle agglomeration and bridging is reduced, all as compared to, and relative to, filter media fibers 44, FIG. 6, extending perpendicular to flow direction 46. In comparing the perpendicular fiber orientation of FIG. 6 against the parallel fiber orientation of FIG. 7, it is seen that the perpendicular fiber orientation provides shorter particle-fiber contact time, less chance of diffusion, greater particle bridging, and uneven loading along the fiber length, whereas the parallel fiber orientation of FIG. 7 provides a greater chance of longer particle-fiber contact time, a greater chance of diffusion of a particle to a fiber, less particle bridging between fibers, and more even loading along the fiber length.

Figure 7:
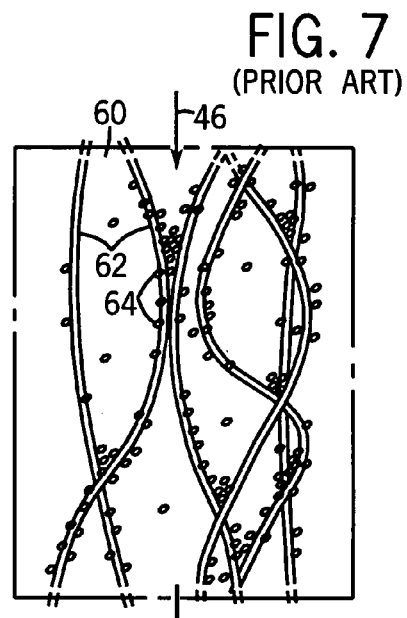
Figure 8:
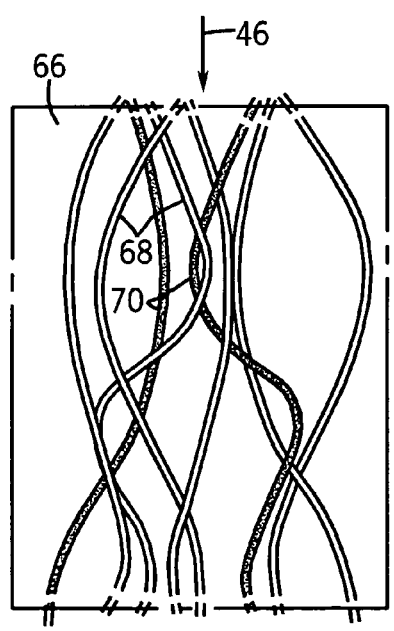

The parallel orientation of FIG. 7 enables the use of non-woven, non-needled media, which is desirable. In one embodiment, fibers 62 are the same, for example synthetic material such as polyester, and have the same diameter. In another embodiment, at least first and second sets of different fibers are used. The latter alternative may include differing fiber diameters to enhance efficiency. In a further embodiment, a triboelectric fiber combination is used to provide a triboelectric effect. Triboelectric fibers are or may become (with usage) differentially charged, as is known. FIG. 8 shows filter media 66 having positively charged fibers 68, such as nylon, silk, cotton, cellulose, acrylic, polyethylene, polypropylene, modacrylic, and negatively charged fibers 70 such as chlorofiber. The oppositely charged fibers define a plurality of electric field flux lines therebetween, and in the desirable orientation of FIG. 8 such flux lines extend dominantly perpendicular to flow direction 46 and are stacked along such flow direction in a plane parallel thereto such that fluid flows along such plane and perpendicular to the flux lines and cuts serially sequentially across plural flux lines, increasing the chances of triboelectric capture due to the increased number of flux lines crossed, relative to known triboelectric capture techniques.

Figure 10:
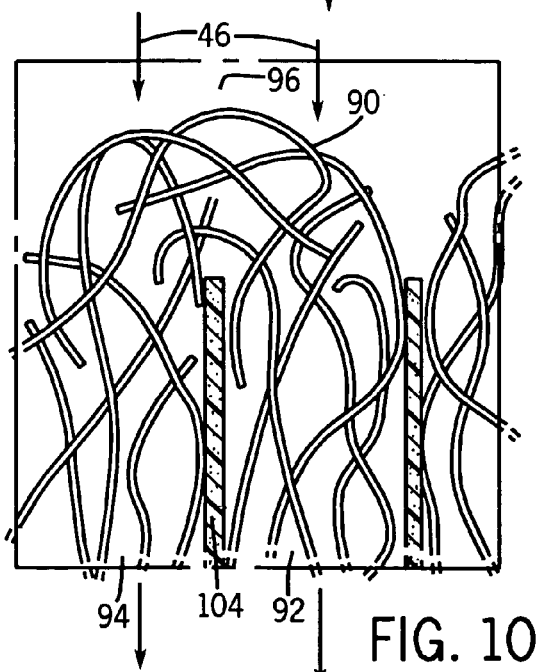
Figure 9:
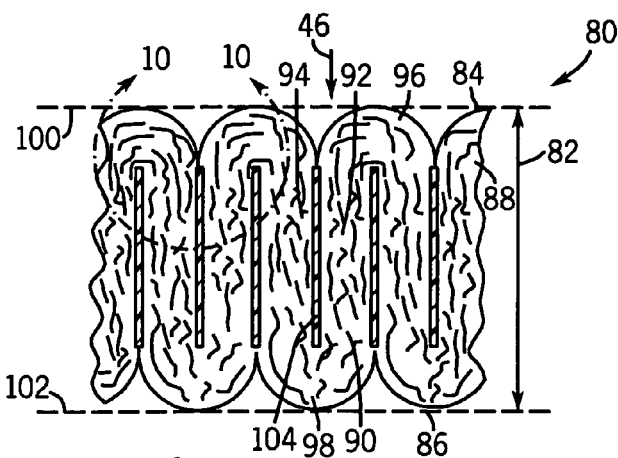

Filter media construction, FIGS. 9 and 10, is provided by a sheet 80 having a thickness dimension 82 between oppositely facing first and second sides 84 and 86 for filtering contaminant particles in fluid flow therethrough along flow direction 46 perpendicular to sheet 80 and first and second sides 84 and 86 and parallel to thickness dimension 82. Sheet 80 is formed by an internal pleated subsheet 88 comprising a plurality of fibers 90 and having a plurality of pleats 92, 94, etc. extending between first and second sets of pleat tips 96 and 98. Pleats 92, 94 extend parallel to flow direction 46. The first set of pleat tips 96 provides the first side 84 of sheet 80. The second set of pleat tips 98 provides the second side 86 of sheet 80. One or both sides 84 and 86 may additionally include a thin scrim layer or the like as shown at dashed lines 100 and 102.

Pleats 92, 94, etc., engage each other and are packed against each other sufficiently tightly such that fluid flows along flow direction 46 through the pleats in parallel therewith, rather than between the pleats and then transversely therethrough as in standard pleated filter media designs. Subsheet 88 has a pre-pleated planar condition with fibers 90 extending dominantly parallel thereto and dominantly unidirectionally parallel to each other. Subsheet 88 has a pleated condition as shown in FIGS. 9 and 10 forming macro sheet 80 wherein fibers 90 extend along pleats 92, 94, etc., substantially parallel to flow direction 46. Fibers 90 extend around pleat tips 96, 98 substantially parallel to each respective side 84, 86 of sheet 80 and substantially perpendicular to flow direction 46. In preferred form, pleats 92, 94, etc. are bonded to each other as shown at adhesive 104 to prevent flow of fluid therebetween along flow direction 46 parallel to pleats 92 and 94. The bonding of the pleats to each other enhances compression resistance of sheet 80 along thickness dimension 82 and eliminates the need for needle holes associated with needling.

Figure 11:
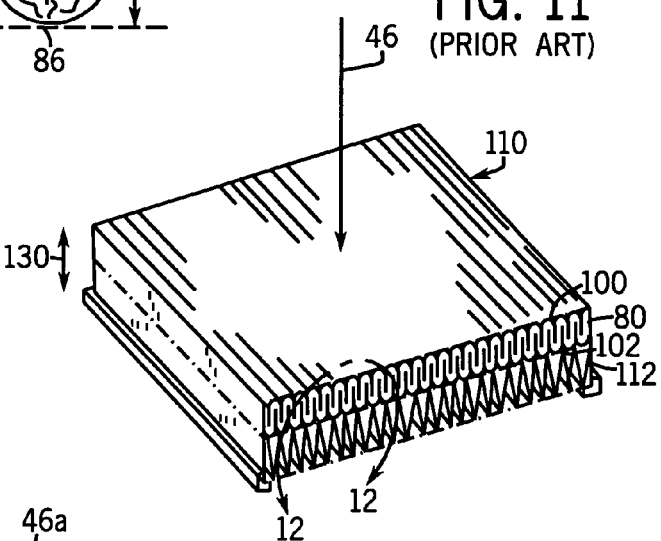
Figure 12:
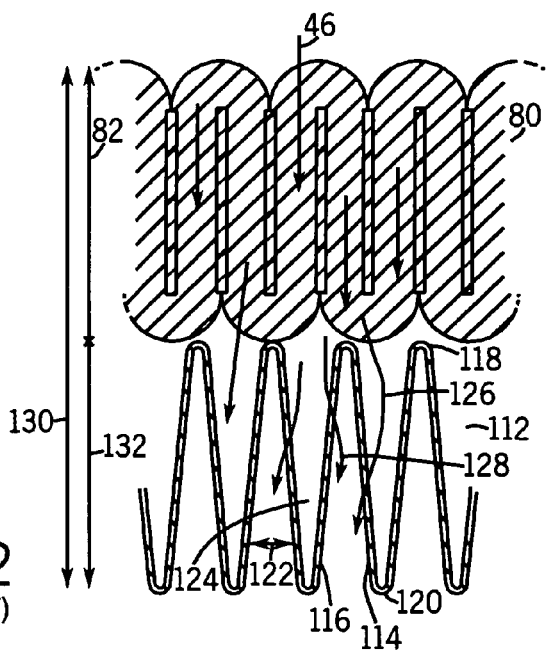

Sheet 80 may be used as a high capacity filter or as a prefilter to increase total filter efficiency and capacity. FIGS. 11 and 12 show an embodiment of the latter which is an extended life two-stage fluid filter assembly 110 for filtering particles in fluid flow therethrough along flow direction 46. The assembly includes a first upstream prefilter element provided by sheet 80, and a second downstream main filter element 112. Filter element 112 is a pleated media (e.g., paper) filter element having a plurality of pleats 114, 116, etc. extending between first and second sets of pleat tips 118 and 120. The pleats of each of filter elements 80 and 112 are substantially parallel to flow direction 46 and extend along flow direction 46 between respective pleat tips. The pleats of filter element 112 are spaced from each other along a spacing direction 122 transverse to flow direction 46 and defining a transverse gap 124 therebetween through which fluid flows. Fluid flows transversely through pleats 114, 116 of filter element 112, as shown at arrows 126, 128. The pleats of filter element 80 are packed against each other, as above described, without such transverse gap and block fluid flow therebetween. In upstream filter element 80, fluid flows along flow direction 46 through pleats 92, 94 in parallel therewith, rather than transversely therethrough. Fluid flow through pleats 114, 116 of downstream main filter element 112 is substantially transverse to flow direction 46. Fluid flow through pleats 92, 94 of upstream prefilter element 80 is substantially parallel to flow direction 46. In FIGS. 11 and 12, each of main filter element 112 and prefilter element 80 are flat planar panels.

Figure 13:
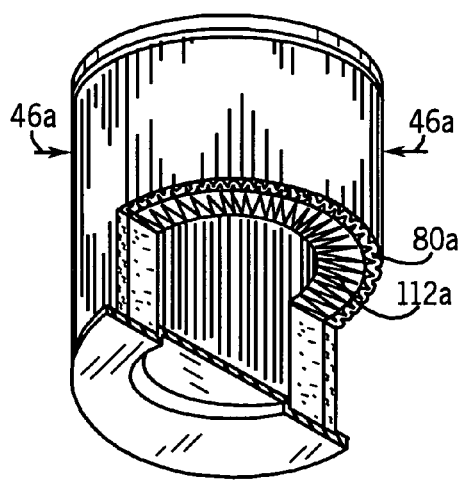

In another embodiment, FIG. 13, each of main filter element 112a and prefilter element 80a are annular, and flow direction 46a is radial relative thereto. Prefilter element 80a is concentric to main filter element 112a. In further embodiments, filter elements 80 and 112 may be conical or frustoconical, or other desired shapes. In each case, filter media construction 80 may be used alone or in combination with another filter element such as 112.

When sheet 80 is used as a prefilter, it is preferred that the solidity of subsheet 88 be in the range of 1% to 10%, the fiber size of fibers 90 be in the range of 0.1 to 50 denier, the thickness dimension 82 of sheet 80 be in the range of 2 to 75 millimeters, and the ratio of velocity of fluid flow through prefilter element 80 to the velocity of fluid flow through main filter element 112 be in the range of 2 to 25.

The '144 invention enables use of a non-woven non-needled fibrous macro filter media sheet formed by a convoluted or pleated internal structure subsheet for fluid filtration, including gaseous or air filtration. Such a sheet 80 may be used as a high capacity filter or as a prefilter to increase total filter efficiency and capacity. The thickness 82 of the filter media is equivalent to the internal convolution or pleat depth. The media preferably retains its form by bonding at 104 the fibers on adjacent faces of the pleats 94, 92. This enhances the media's compression resistance and increases its rigidity such that no additional backing is required for the media to retain its shape, though additional outer scrim layers such as 100 and 102 may optionally be added if desired. The tight packing of the pleats and bonding at 104 is further desired to eliminate the need for needle holes associated with prior needling techniques, thereby eliminating needle holes 22, and improving filtration efficiency. If desired, bonding 104 may be deleted if pleats 92, 94 are sufficiently tightly packed. The tightly packed convoluted internal subsheet structure 88 causes the majority of fibers 90 to be oriented in a direction parallel to fluid flow 46, affording advantages of longer residence time for particles passing through the media, reduced particle agglomeration and bridging, higher collapse strength, increased capacity and efficiency. The fiber orientation and filter media construction is further desirable because it is conducive to the use of mixed fibers, including different diameter fibers and/or different polarity fibers, the latter being further desirable because it provides an enhanced triboelectric effect due to flux lines stacked along the flow direction such that fluid flows perpendicular to the flux lines and cuts serially sequentially across plural flux lines, increasing the chances of triboelectric capture due to the increased number of flux lines crossed. This enhanced triboelectric effect, beyond traditional triboelectric mechanisms, is useful for capturing small particles which typically clog a downstream main or primary filter such as 112.

The '144 invention is particularly useful for increasing filter life in filters exposed to high dust concentrations of dry and/or sooty and/or oily particles. Previous non-woven designs used needling techniques to achieve the required media thickness and solidity. During the process of needling, needle holes are formed through the media. Such needle holes, formed in felted and other synthetic filter materials, promote the penetration of detached and reentrained particles. The needle holes present discontinuities in the filter media structure because they are relatively large pores when compared to the bulk fiber matrix. The large pores offer a path of low resistance to the fluid flow. Because the smaller pores in areas laterally between needle holes are clogged faster by deposited particles, the velocity through the larger needle holes increases correspondingly. Consequently, both captured and detached reentrained dust particles can penetrate the filter through such needle holes, resulting in lower filter efficiency. Needle punching is thus undesirable because it creates favorable conditions for particle reentrainment. Furthermore, since the majority of fibers in prior designs are positioned perpendicularly to the flow direction, the surface area of particle adhesion is small while the face surface area of particle clusters is larger. Thus, particle aggregates and bridges can be easily blown off. In the present improvement orienting the fibers primarily parallel to the flow direction, the contact surface area between the dust particles and their aggregates remains large and the face area of the dust aggregates stays small during dust loading. This is a favorable condition for a stable filtration process.

The extended life two-stage filter assembly noted above may be provided in a variety of geometrical configurations, as noted, to achieve ultrahigh contaminant holding capacity and long life in high concentration areas, for instance in dusty construction areas and/or in oily and sooty environments. The main filter 112 is located downstream of the prefilter 80. The main filter is made of pleated filter media impregnated cellulose with a possible mixture of synthetic fibers such as polyester to secure shape stability when exposed to moisture, water and snow. The media of the pleated main filter element 112 can be treated with an oily substance to prevent clogging by sooty particles, as is known. The upstream prefilter 80 is made of non-woven non-needled filter media of synthetic fibers of preferably differently charged materials to fully utilize the triboelectric effect, and to provide an enhanced triboelectric effect as noted.

The reduction of blow-off detachment and reentrainment of contaminant particles is a significant advance. In the prior art, since the majority of the fibers are positioned perpendicular to the flow direction, the surface area of particle adhesion is small while the face surface area of particle clusters at agglomerates and particle bridges is large. Therefore, the particle aggregates can be more easily blown off since the force of detachment is proportional to fluid velocity and cluster surface area exposed to flow. By instead orienting the fibers parallel to the flow direction, the contact surface area between the dust particles and their aggregates remains large and the face area of the dust aggregates stays small during dust loading. This is a favorable condition for a stable filtration process providing a longer chance of fiber-particle contact time and a greater chance of diffusion to the fiber surface area, increased diffusion probability, improved contaminant loading along the fiber length and increased spread of and even loading of particles along the fibers, eliminating needle holes and the noted problems associated therewith, and providing an enhanced triboelectric effect when differentially charged fibers are used. In the '144 design, contaminant holding capacity is higher as compared to prior designs because of the favorable contaminant loading process. In prior designs, the contaminant can accumulate on the fibers such that particle bridges form, blocking fluid flow. In the '144 design, the contaminant particle cake is distributed more evenly on the entire fiber surface area. Because of the uniform contaminant distribution, filter pressure drop decreases and the amount of dust or other contaminant loaded within the filter increases before terminal pressure drop.

Another advantage of the '144 filter media construction is that the contaminant cake remains stable due to the noted high rigidity and compression resistance. The compression resistance of the media at its low solidity enables formation of a uniformly distributed and stable contaminant cake which does not collapse when exposed to flow pulsation and vibration of the filtration system. Because of the uniformity of the internal contaminant cake in the prefilter, the contaminant particles penetrating the prefilter are evenly distributed over the entire area of the pleated main filter element 112 located downstream of prefilter 80. Since pressure drop reaches its lowest value for uniformly distributed particles on the media surface, i.e. a uniformly thin contaminant cake, the contaminant capacity reaches its maximum value.

The '144 invention provides a method of increasing contaminant cake stability on filter media fibers in filter media filtering contaminant particles by engaging and packing pleats 92 and 94 against each other, preferably by bonding at 104, to enhance rigidity and compression resistance of sheet 80 along thickness dimension 82. The '144 invention further provides a method for evenly distributing fluid flow over the area of main filter element 112 after passage through prefilter element 80, by increasing uniformity of the contaminant cake on prefilter 80 by reducing particle agglomeration and particle bridging between prefilter media fibers which would otherwise block flow and reduce uniformity and be subject to instability and reentrainment, and instead orient prefilter filters 62, FIG. 7, 90, FIG. 9, dominantly parallel to flow direction 46 to more evenly load contaminant particles along the entire length of the fibers as compared to, and relative to, filter media fibers extending perpendicular to the flow direction.

Since the fibers in the new orientation are positioned parallel to the flow direction, the dwell or residence time for the contaminant particles moving the vicinity of the fiber surface is extended. This enhances small particle, e.g. diesel soot, captured by the fibers because of diffusion and by triboelectric effect if differentially charged fibers are used, which effect is enhanced as above noted. The parallel fibers form channel-like paths in which viscous flow predominates. In the viscous flow, the boundary layer is slower and relatively thick, and hence more particles will have a chance to settle on the fiber surface due to Brownian diffusion and due to electrostatic mechanisms. The '144 method and orientation makes conditions favorable for these mechanisms to occur.

PRESENT INVENTION

Figure 14:
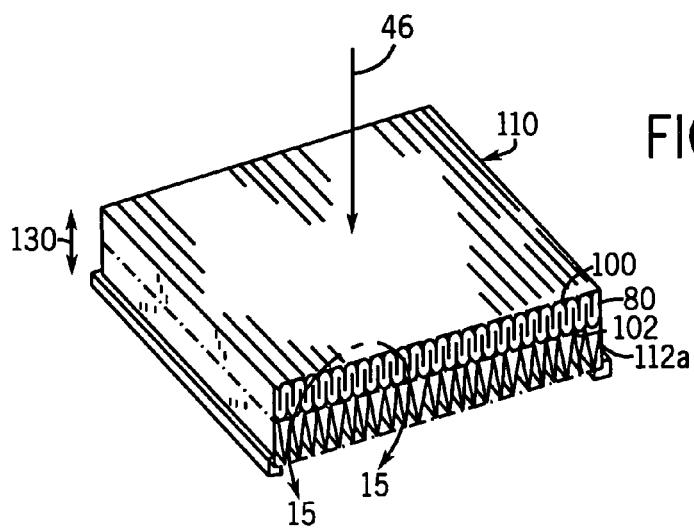
FIG. 14 shows an extended life two-stage filter assembly in accordance with the invention.
Figure 15:
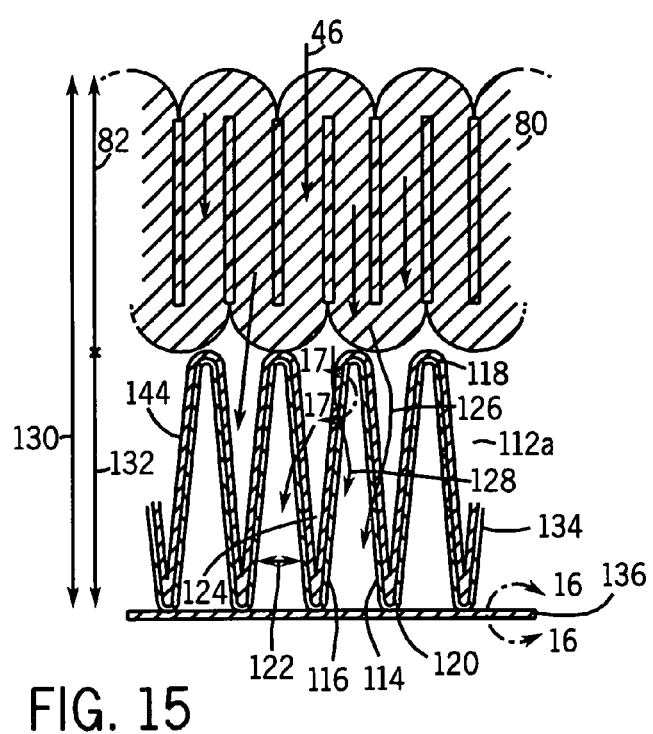
FIG. 15 is an enlarged view of section 15—15 of FIG. 14.

FIGS. 14 and 15 use like reference numerals from FIGS. 11 and 12 where appropriate to facilitate understanding.

Figure 16:
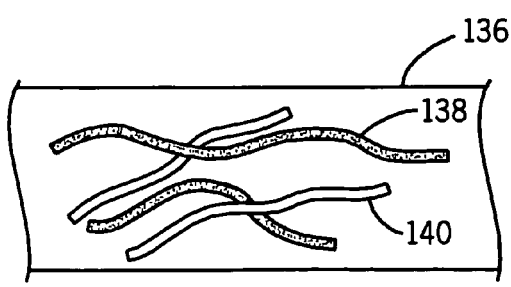
FIG. 16 is an enlarged view of section 16—16 of FIG. 15.

135 selected from the group consisting of cellulose fibers and synthetic fibers. Sheet 136 has second and third sets of fibers, the second and third sets having tribologically different fibers 138 and 140, FIG. 16, providing a triboelectric effect, comparably to that above described. For example, filter media 136 may have positively charged fibers 138, such as nylon, silk, cotton, cellulose, acrylic, polyethylene, polypropylene, modacrylic, and negatively charged fibers 140 such as chlorofiber. The triboelectric fibers are or may become (with usage) differentially charged, as is known. Sheet 134 is preferably between prefilter element 80 and sheet 136. In an alternative, the tribologically different fibers may be provided as part of sheet 134, with elimination of sheet 136. In the embodiment shown in FIGS. 14–16, the main filter element is a panel filter element lying in a plane for filtering particles in fluid flowing therethrough as shown at 46 transversely to such plane. In an alternative, the main filter element is an annular member like FIG. 13 having a hollow interior extending along an axis for filtering particles in fluid flowing therethrough radially as shown at 46a relative to such axis. Annular includes various closed-loop shapes including cylindrical, oval, racetrack-shaped, and so on.

Table 1 shows test results including dust holding capacity in grams (g), and final gravimetric efficiency in percent (%), for various filters including: only pleated media 77 (having a Frazier permeability of 77 fpm (feet per minute), as main filter 112, FIGS. 11, 12); prefilter 220 (a basis weight of 220 g/m² (grams per square meter), for prefilter 80 in combination with media 77; prefilter 220 in combination with media 77 in combination with media 23 (triboelectric media 136 having a Frazier permeability of 23 g/m² used in combination with prefilter element 80 and main filter element 112a); prefilter 350 (a basis weight of 350 g/m²) in combination with media 77; prefilter 350 in combination with media 77 in combination with media 23; only pleated media 26 (main filter element 112 having a Frazier permeability of 26 fpm); prefilter 220 in combination with media 26; prefilter 220 in combination with media 26 in combination with media 23; prefilter 350 in combination with media 26; prefilter 350 in combination with media 26 in combination with media 23.

TABLE 1

| Filter Performance | Filter Description | | | | | | | | | |
|---|---|---|---|---|---|---|---|---|---|---|
| | Only pleated media 77 | Prefilter 200, media 77 | Prefilter 220, media 77, media 23 | Prefilter 350, media 77 | Prefilter 350, media 77, media 23 | Only pleated media 26 | Prefilter 220, media 26 | Prefilter 220, media 26, media 23 | Prefilter 350, media 26 | Prefilter 350, media 26, media 23 |
| Dust Holding Capacity, (g) | 3253.6 | 3495.5 | 3245.2 | 3800.0 | 3780.8 | 3415.8 | 3366.2 | 3449.4 | 3976.9 | 4008.4 |
| Final Gravimetric Efficiency, (%) | 99.82 | 99.80 | 99.91 | 99.85 | 99.93 | 99.95 | 95.50 | 99.80 | 99.95 | 99.98 |

FIG. 14 shows a multi-stage filter 110a having an upstream prefilter element 80, and a downstream main filter element 112a. The main filter element includes two sheets, namely a pleated first sheet 134, FIG. 15, and a second sheet 136 which may be a flat planar sheet as shown in FIG. 15, or may be pleated with sheet 134. Sheet 134 has a first set of fibers In Table 1, it is seen that adding triboelectric media 23 to the combination of prefilter 220 and media 77 results in a drop in dust holding capacity from 3495.5 to 3245.2 grams, and an increase in final gravimetric efficiency from 99.80% to 99.91%. Upon adding triboelectric media 23 to the combination of prefilter 350 and media 77, the dust holding capacity drops from 3800.0 grams to 3780.8 grams, and the final gravimetric efficiency increases from 99.85% to 99.93%. Upon adding triboelectric media 23 to the combination of prefilter 220 and media 26, the dust holding capacity increases from 3366.2 grams to 3449.4 grams, and the final gravimetric efficiency increases from 95.50% to 99.80%. Upon adding triboelectric media 23 to the combination of prefilter 350 and media 26, the dust holding capacity increases from 3976.9 grams to 4008.4 grams, and the final gravimetric efficiency increases from 99.95% to 99.98%. The latter combination provides the highest dust holding capacity and the highest final gravimetric efficiency.

Table 2 shows test results including pressure drop increase P in kilopascals (kPA), mass of accumulated dust m in grams (g), and the ratio m/P, for filters A through F, where filters A through C are various filter assemblies having only a pleated main filter element, filter D is a pleated main filter element with plural layers of prefilter media in a planar sheet (i.e. not pleated as at prefilter 80), filter E is a pleated main filter element in combination with pleated prefilter 80 and in combination with triboelectric media 136, and filter F is a pleated main filter with a planar prefilter (not pleated like prefilter 80) and in combination with triboelectric media.

134, FIG. 15. Nanofibers 142 have a fiber diameter in the range 40 to 800 nm (nanometers), and a basis weight in the range 0.02 to 1.0 g/m$^2$ (grams per square meter). Sheet 134 includes the noted set of fibers 135 selected from the group consisting of cellulose fibers and synthetic fibers and having a fiber diameter substantially greater than nanofibers 142. Sheets 134 and 144 are preferably pleated together as subsheets, with subsheet 144 being upstream of subsheet 134, though the order can be reversed. In further embodiments, nanofibers 142 and/or triboelectric fibers 138, 140 may be incorporated into pleated media sheet 134 of main filter element 112a.

Table 3 shows filter performance including media face velocity in cm/s (centimeters per second), dust retained in grams, dust capacity in g/sq.m. (grams per square meter), initial efficiency percent (%), final efficiency percent (%), and initial restriction in Pa (pascals), for various filter combinations including: in the first row, a pleated main filter 112a with nanofiber media 144 having a Frazier permeability greater than 100 fpm; in the second row, a pleated main filter element 112a having nanofiber media 144 with Frazier permeability greater than 100 fpm in combination with a

TABLE 2

FIELD TEST

Filter Description

| Performance Characteristics | A - Commercial Pleated Element | B - Commercial Pleated Element | C - Commercial Pleated Element | D - Commercial Multi Media Element (several layers of prefilter media) | E - Pleated Filter with parallel fiber prefilter, and Triboelectric media | F - Pleated Filter with transverse fiber prefilter, and Triboelectric |
|---|---|---|---|---|---|---|
| Pressure Drop increase, P [kPA] | 0.515 | 0.246 | 0.381 | 0.269 | 0.017 | 0.085 |
| Mass of Accumulated Dust, m [g] | 159 | 143 | 409 | 253 | 231 | 240 |
| Ratio m/P | 308 | 580 | 1,074 | 941 | 13,253 | 2,835 |

Table 2 shows that the best ratio of mass of dust collected to increased pressure drop, i.e. m/P, namely 13,253, is for filter combination E.

Figure 17:
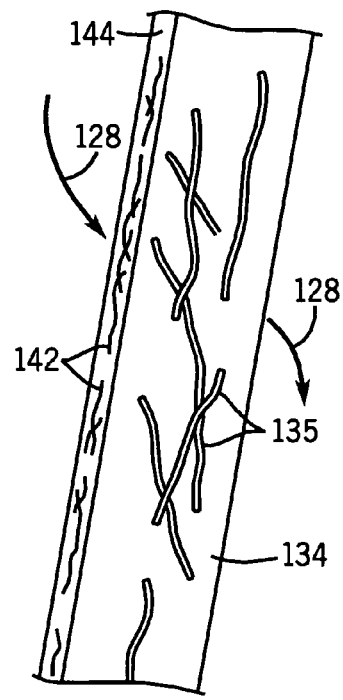
FIG. 17 is an enlarged view of section 17—17 of FIG. 15.

FIGS. 14, 15, 17 further show a multi-stage filter, including upstream prefilter element 80 and downstream main filter element 112a, wherein one of the elements, preferably 112a, includes nanofibers, such as nanofibers 142, FIG. 17, in sheet 144 on sheet 134. Sheet 144 is pleated with sheet prefilter element 80; in the third row, a pleated main filter element 112a in combination with nanofiber media 144 having a Frazier permeability of 25 fpm; in the fourth row, a pleated main filter element 112a having nanofiber media 144 with a Frazier permeability of 25 fpm in combination with prefilter element 80; and in the fifth row, a pleated main filter element 112a with media 134 of Frazier permeability of 13 fpm.

TABLE 3

Filter performance for filters made of nanofiber filter media

| Media description | Media Face Velocity (cm/s) | Dust Retained (grams) | Dust Capacity (g/sp. m.) | Initial Eff. (%) | Final Eff. (5) | Init. Rest. (Pa) |
|---|---|---|---|---|---|---|
| Pleated filter element - nanofiber media A with Frazier permeability of >100 | 7.5 | 85.72 | 178.00 | 95.661 | 99.511 | 27.4 |
| Pleated filter element - nanofiber media A with Frasier permeability of >100 and a prefilter | 7.5 | 327.3 | 680.00 | 96.595 | 99.667 | 55 |
| Pleated filter element - Nanofiber media A with Frazier permeability of 25 | 7.5 | 103.94 | 216.00 | 99.611 | 99.974 | 97 |

TABLE 3-continued

Filter performance for filters made of nanofiber filter media

| Media description | Media Face Velocity (cm/s) | Dust Retained (grams) | Dust Capacity (g/sp. m.) | Initial Eff. (%) | Final Eff. (5) | Init. Rest. (Pa) |
|---|---|---|---|---|---|---|
| Pleated filter element - nanofiber media A with Frazier permeability of 25 and a prefilter | 7.5 | 267.74 | 557.00 | 99.514 | 99.984 | 116 |
| Pleated filter element - commercial media A with Frazier permeability of 13 | 7.5 | 137.01 | 284.00 | 99.630 | 99.986 | 202 |

PRIOR ART

Figure 18:
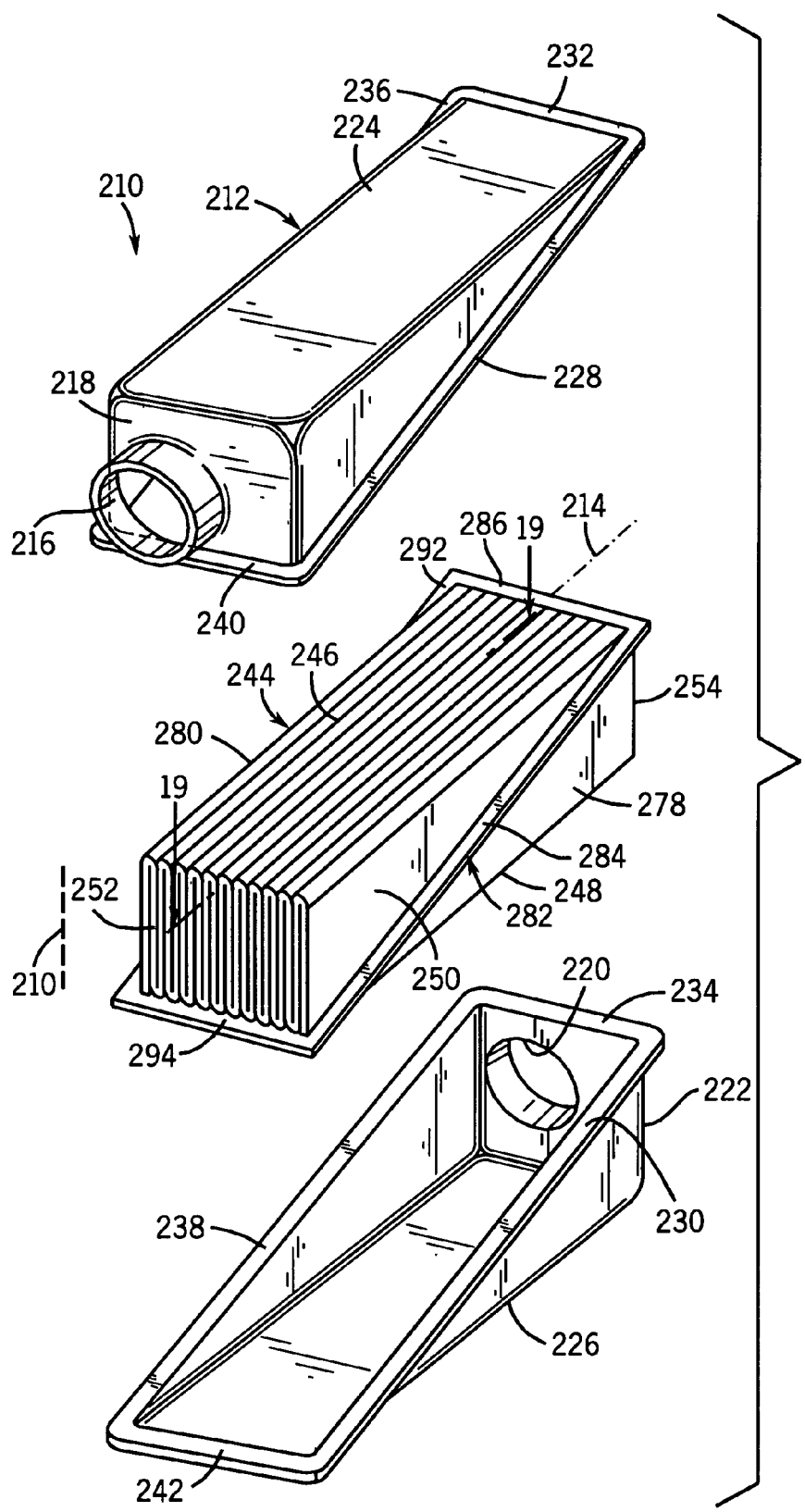

FIG. 18 shows a filter 210 including a housing 212 extending axially along axis 214 and having an inlet 216 at one axial end 218 of the housing and having an outlet 220 at a distally opposite axial end 222 of the housing. The housing is preferably plastic and provided by identical upper and lower half sections 224 and 226 mating along diagonal flanges 228, 230, lateral flanges 232, 234, diagonal flanges 236, 238, and lateral flanges 240, 242.

A pleated filter block is provided by pleated filter element 244 in the housing. The pleated filter element is pleated along a plurality of upper bend lines 246 and lower bend lines 248, which bend lines extend axially. The filter element has a plurality of wall segments 250 extending in serpentine manner between the upper and lower bend lines. The wall segments extend axially between upstream ends 252 at inlet 216, and downstream ends 254 at outlet 220. The wall segments define axial flow channels 255 therebetween, FIG. 19. The upstream ends of the wall segments are alternately sealed to each other, as shown at 256 in FIG. 19, to define a first set of flow channels 258 having open upstream ends 260, and a second set of flow channels 262 interdigitated with the first set of flow channels 258 and having closed upstream ends 264. The downstream ends 254 of wall segments 250 are alternately sealed to each other, as shown at 266 in FIG. 19, such that the first set of flow channels 258 have closed downstream ends 268, and the second set of flow channels 262 have open downstream ends 270. Fluid to be filtered, such as air, flows substantially directly axially through filter element 244, namely from inlet 216 through open upstream ends 260 of the first set of flow channels 258 as shown at arrows 272, then through wall segments 250 as shown at arrows 274, then through open downstream ends 270 of the second set of flow channels 262 as shown at arrows 276, then to outlet 220. It is preferred that at least a portion of each of inlet 216 and outlet 220 are axially aligned.

Filter element 244 has laterally distally opposite right and left axially extending sides 278 and 280, FIG. 18, defining first and second axially extending planes. The second axial plane at side 280 is parallel to and spaced from the first axial plane at side 278. Upper bend lines 246 provide a first or upper set of coplanar bend lines defining a third axially extending plane. Lower bend lines 248 define a lower or second set of coplanar bend lines defining a fourth axially extending plane. The fourth axial plane at lower bend lines 248 is parallel to and spaced from the third axial plane at upper bend lines 246. The third and fourth axial planes are perpendicular to the noted first and second axial planes. Upstream ends 252 of wall segments 250 define a first laterally extending plane, and downstream ends 254 of the wall segments define a second laterally extending plane. The second lateral plane at downstream ends 254 is parallel to and spaced from the first lateral plane at upstream ends 252. The noted first and second lateral planes are perpendicular to the noted first and second axial planes and perpendicular to the noted third and fourth axial planes.

Figure 20:
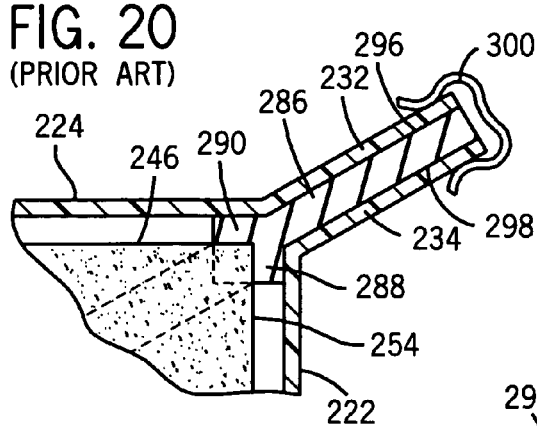
Figure 19:
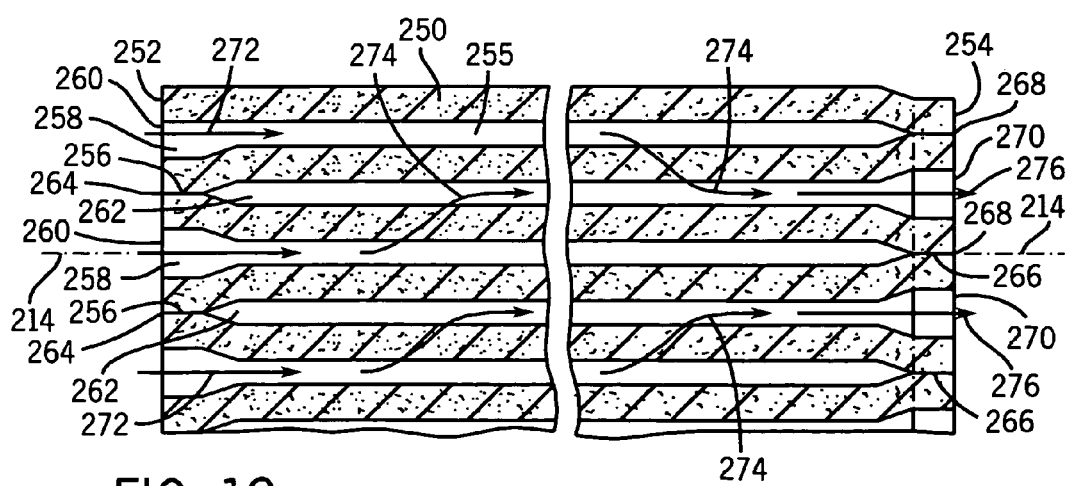

A gasket 282, FIGS. 18, 20, is provided for sealing filter 244 to housing 212, such that air entering inlet 216 cannot bypass the filter element to outlet 220, and instead must flow through the filter element as shown at arrows 272, 274, 276, FIG. 19. Gasket 282 has a first section 284 extending along the noted first axial plane along right side 278. Gasket 282 has a second section 286 extending along the noted second lateral plane at downstream ends 254 as shown at 288 in FIG. 20, and also extending along the noted third axial plane at upper bend lines 246, as shown at 290 in FIG. 20. In alternate embodiments, second section 286 of gasket 282 extends along only one or the other of the noted second lateral plane at 288 or third axial plane at 290, but not both. Gasket 282 has a third section 292 extending along the noted second axial plane along left side 280. Gasket 282 has a fourth section 294 extending along the noted first lateral plane at upstream ends 252 of wall segments 250, and also extending along the noted fourth axial plane at lower bend lines 248, comparably to FIG. 20. In alternate embodiments, fourth section 294 of gasket 282 extends along only one or the other of the noted first lateral plane and fourth axial plane, but not both. Gasket 282 is preferably adhesively secured to filter element 244 along each of the noted gasket sections 284, 286, 292, 294, such that filter element 244 and gasket 282 are replaced as a modular unit. It is further preferred that the upper and lower surfaces of the gasket, such as 296 and 298, FIG. 20, be pinched and compressed between respective housing flanges such as 232 and 234, with such outer peripheral sandwich arrangement being held in assembled condition by any suitable means, such as clip 300, clamps, bolts, or the like. In alternate embodiments, other surfaces of the gasket may be used as the sealing surface against the housing. First and third gasket sections 284 and 292 extend obliquely relative to axis 214. Second and fourth gasket sections 286 and 294 extend perpendicularly to the noted first and second axial planes. Second and fourth gasket sections 286 and 294 are axially spaced, and first and third gasket sections 284 and 292 extend diagonally between second and fourth gasket sections 286 and 294.

Figure 21:
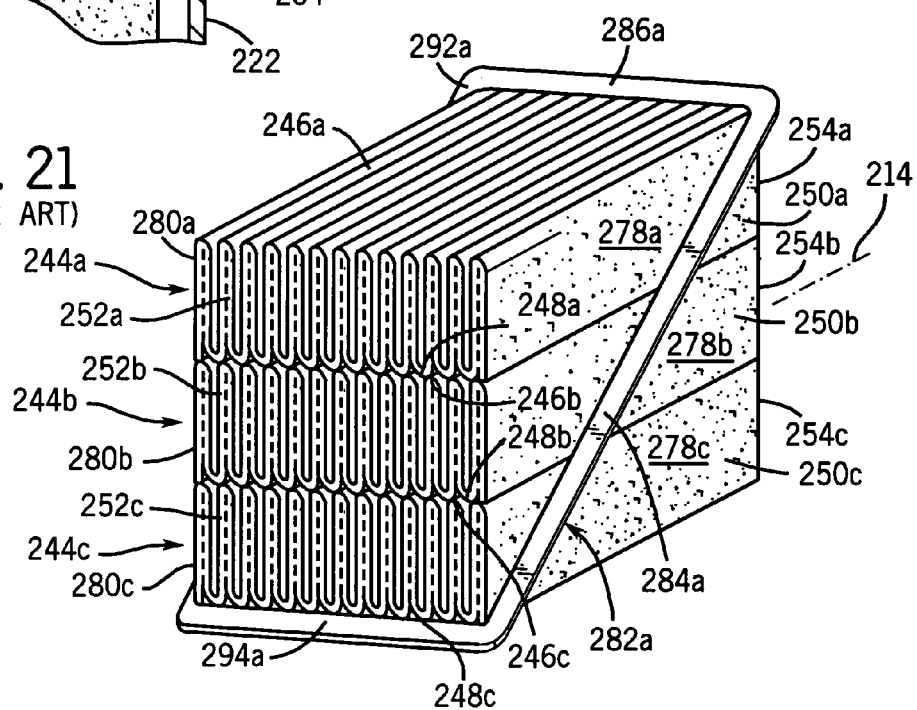

FIG. 21 shows a further embodiment having a plurality of filter elements 244a, 244b, 244c stacked on each other. The filter elements have respective wall segments 250a, 250b, 250c with upstream ends 252a, 252b, 252c and downstream ends 254a, 254b, 254c. Upstream ends 252a, 252b, 252c of the wall segments are coplanar along a first laterally extending plane. Downstream ends 254a, 254b, 254c are coplanar along a second laterally extending plane. The second lateral plane is parallel to and spaced from the first lateral plane. The filter elements have respective laterally distally opposite right and left sides 278a and 280a, 278b and 280b, 278c and 280c. Right sides 278a, 278b, 278c are coplanar along a first axially extending plane. Left sides 280a, 280b, 280c are coplanar along a second axially extending plane. The second axial plane is parallel to and spaced from the first axial plane. The filter elements 244a, 244b, 244c have respective upper sets of coplanar bend lines 246a, 246b, 246c, and lower sets of coplanar bend lines 248a, 248b, 248c. The upper set of coplanar bend lines 246a of top filter 244a defines a third axially extending plane. The lower set of coplanar bend lines 248c of the bottom filter element 244c defines a fourth axially extending plane. The fourth axial plane is parallel to and spaced from the third axial plane. The third and fourth axial planes are perpendicular to the first and second axial planes. The noted first and second lateral planes are perpendicular to the noted first and second axial planes and perpendicular to the noted third and fourth axial planes. Gasket 282a has a first section 284a extending along the noted first axial plane along right sides 278a, 278b, 278c. Gasket 282a has a second section 286a extending along the noted second lateral plane along downstream ends 254a, and also along the noted third axial plane along upper bend lines 246a. In alternate embodiments, gasket section 286a extends along only one or the other of the noted second lateral plane along downstream ends 254a or along the noted third axial plane along upper bend lines 246a, but not both. Gasket 282a has a third section 292a extending along the noted second axial plane along left sides 280a, 280b, 280c. Gasket 282a has a fourth section 294a extending along the noted first lateral plane along upstream ends 252a, 252b, 252c, and also extending along the noted fourth axial plane along lower bend lines 248c. In alternate embodiments, gasket section 294a extends along only one of the noted first lateral plane along upstream ends 252a, 252b, 252c or the noted fourth axial plane along lower bend lines 248c, but not both. The construction in FIG. 21 provides a pleated filter block having one or more rows of wall segments 250a, 250b, 250c folded in serpentine manner between respective bend lines, and providing filtered fluid flow substantially directly axially through the filter block along axis 214. First and third gasket sections 284a and 292a extend obliquely relative to axis 214. Second and fourth gasket sections 286a and 294a extend perpendicularly to the noted first and second axial planes. Second and fourth gasket sections 286a and 294a are axially spaced, and first and third gasket sections 284a and 292a extend diagonally between second and fourth gasket sections 286a and 294a.

Figure 22:
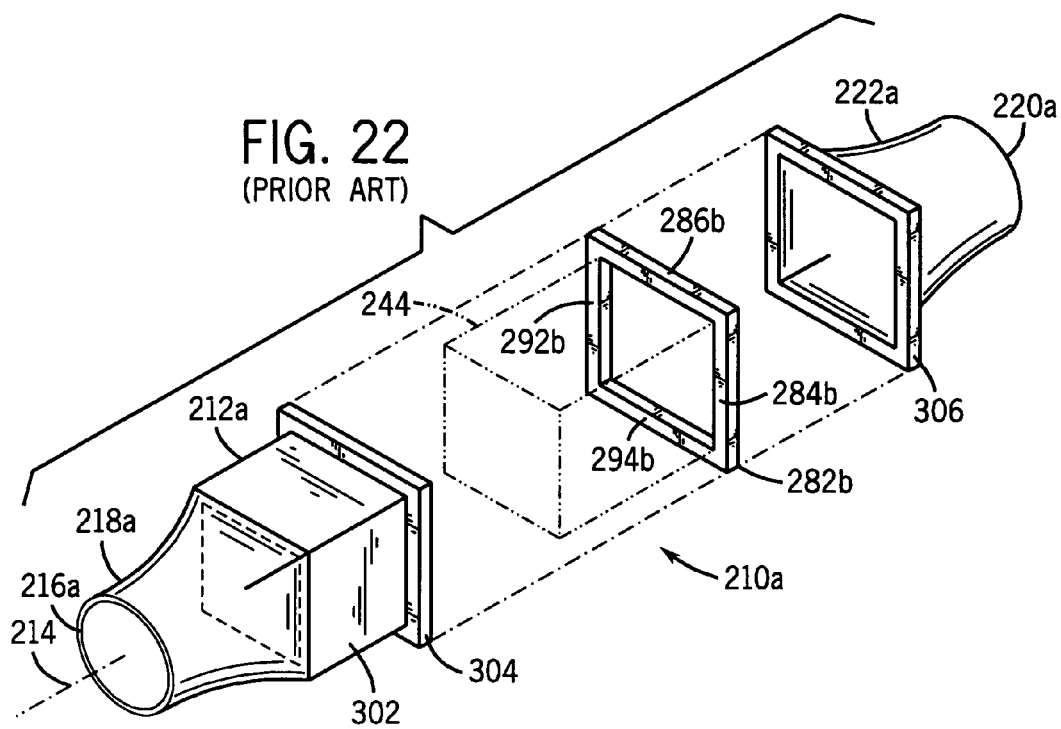

FIG. 22 shows a further embodiment, and uses like reference numerals from above where appropriate to facilitate understanding. Filter 210a includes a housing 212a extending axially along axis 214 and having an inlet 216a at one axial end 218a of the housing and having an outlet 220a at a distally opposite axial end 222a of the housing. The housing is preferably plastic and provided by a box-like member 302 having an outer peripheral flange 304 mating with flange 306 of housing end 222a and pinching gasket 282b therebetween. Gasket 282b seals pleated filter block 244 or 244a in the housing. Unlike first and third sections 284 and 292 of gasket 282 in FIG. 18, first and third sections 284b and 292b of gasket 282b in FIG. 22 extend perpendicularly to the noted third and fourth axial planes. Like second and fourth sections 286 and 294 of gasket 282 in FIG. 18, second and fourth sections 286b and 294b of gasket 282b in FIG. 22 extend perpendicularly to the noted first and second axial planes. Gasket 282b has first section 284b extending along the noted first axial plane along right side 278 and also preferably extending along one of the noted lateral planes preferably the noted second lateral plane along downstream ends 254. Gasket 282b has second section 286b extending along the noted third axial plane along upper bend lines 246 and also along the noted one lateral plane preferably the lateral plane along downstream ends 254. Gasket 282b has third section 292b extending along the noted second axial plane along left side 280 and preferably along the noted one lateral plane preferably the lateral plane formed at downstream ends 254. Gasket 282b has fourth section 294b extending along the noted fourth axial plane along the noted lower bend lines 248 and also preferably along the noted one lateral plane preferably the lateral plane along downstream ends 254.

Figure 23:
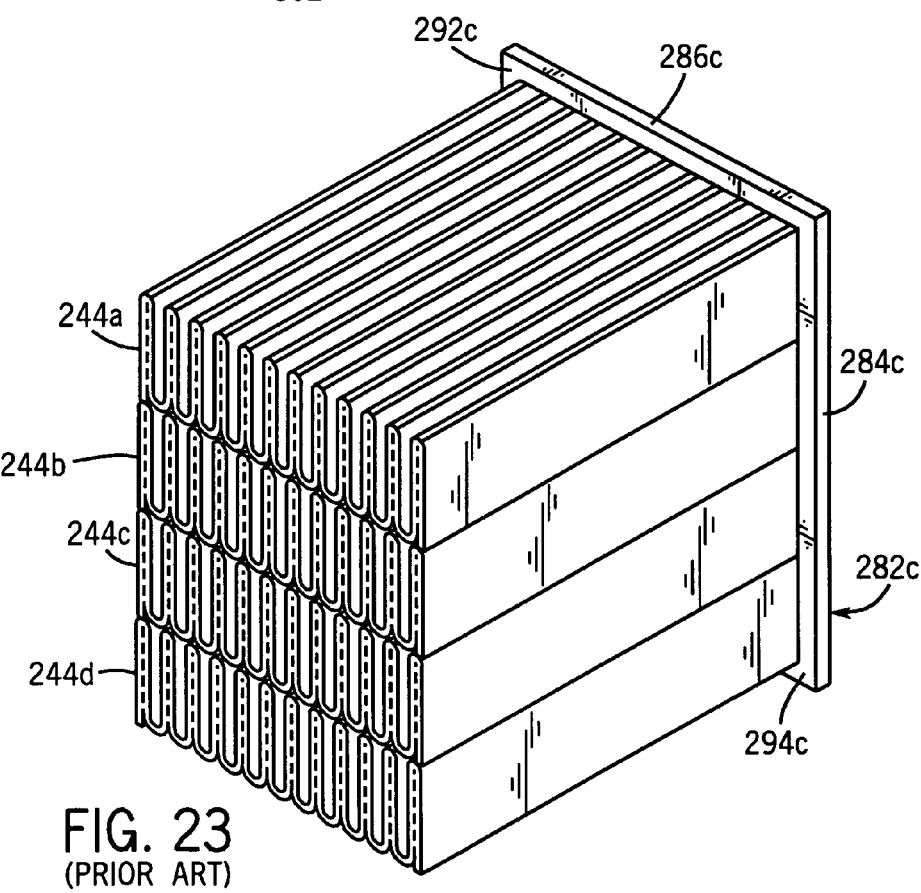
Figure 28:
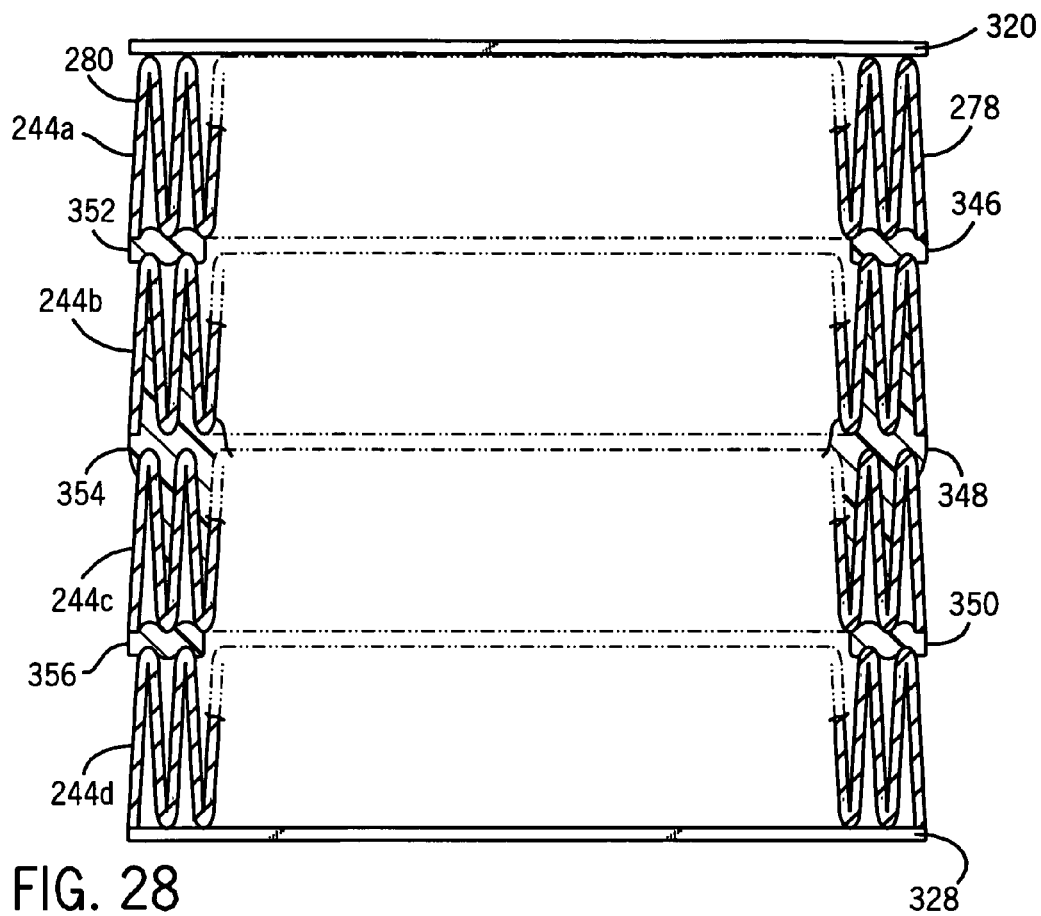
Figure 29:
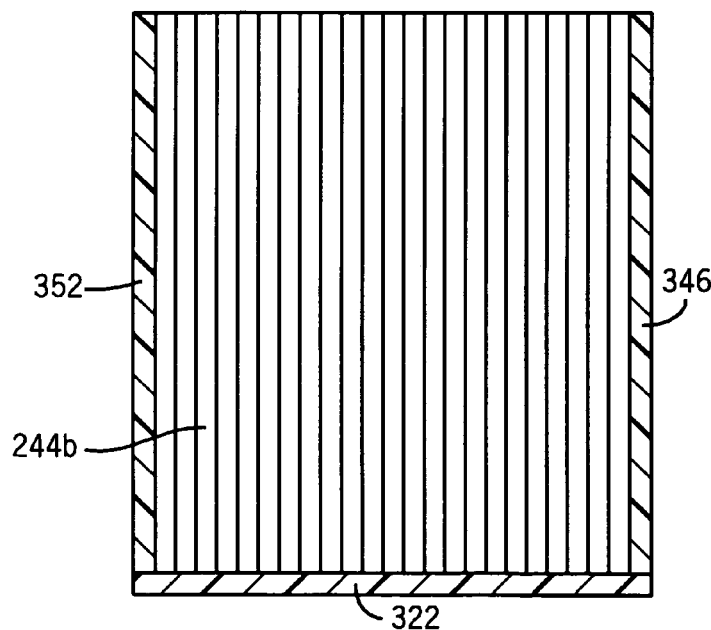

FIG. 23 shows a further embodiment and uses like reference numerals from above where appropriate to facilitate understanding. Filter elements 244a, 244b, 244c, 244d are stacked on each other. Gasket 282c corresponds to gasket 282b of FIG. 22 and includes corresponding gasket sections 284c, 286c, 292c, 294c.

FIG. 24 is similar to FIG. 23 and uses like reference numerals from above where appropriate to facilitate understanding. Layers of sealing material 310, 312, etc. are between respective adjacent stacked filter elements, FIG. 25. In one embodiment, each layer 310, 312, etc. is impervious to the noted fluid to be filtered. In another embodiment, each layer 310, 312, etc. is pervious to such fluid and filters fluid flow therethrough. In the embodiment of FIGS. 24 and 25, each layer 310, 312, etc. spans the entire area between upstream ends 252 and downstream ends 254 and between right and left sides 278 and 280.

FIGS. 26–32 show another embodiment wherein the noted sealing layers of FIGS. 24 and 25 need not span the entire noted area between upstream and downstream ends 252 and 254 and right and left sides 278 and 280. In FIGS. 26–32, the noted sealing layers are provided by alternating strip layers such as 320, 322, 324, 326, 328, FIGS. 26, 27, including a first set of one or more upstream laterally extending strip layers 322, 326, etc., and a second set of one or more downstream laterally extending strip layers 320, 324, 328, etc., interdigitated with the first set of strip layers. Each strip layer 322, 326, etc. of the first set extends laterally between the right and left sides 278 and 280 at upstream end 252 and extends along the lower bend lines of the filter element thereabove and the upper bend lines of the filter element therebelow. Each strip layer 320, 324, 328, etc. of the second set extends laterally between right and left sides 278 and 280 at downstream end 254 and extends along the lower bend lines of the filter element thereabove and the upper bend lines of the filter element therebelow. A given filter element, e.g. 244b, has a strip layer 322 of the first set extending laterally along its upper bend lines at upstream end 252, and a strip layer 324 of the second set extending laterally along its lower bend lines at downstream end 254. Filter element 244b has no strip layer along its upper bend lines at downstream end 254, and has no strip layer along its lower bend lines at upstream end 252.

A first filter element such as 244a has a first strip layer 322 of the first set extending along its lower bend lines at upstream end 252, a second filter element such as 244b has a first strip layer 324 of the second set extending laterally along its lower bend lines at downstream end 254, a third filter element such as 244c has a second strip layer 326 of the first set extending along its lower bend lines at upstream end 252. The noted first and second filter elements 244a and 244b have the first strip layer 322 of the first set extending laterally therebetween at upstream end 252. The noted first and second filter elements 244a and 244b have no strip layer extending laterally therebetween at downstream end 254. The noted second and third filter elements 244b and 244c have first strip layer 324 of the second set extending laterally therebetween at downstream end 254. The noted second and third filter elements 244b and 244c have no strip layer extending laterally therebetween at upstream end 252.

Figure 30:
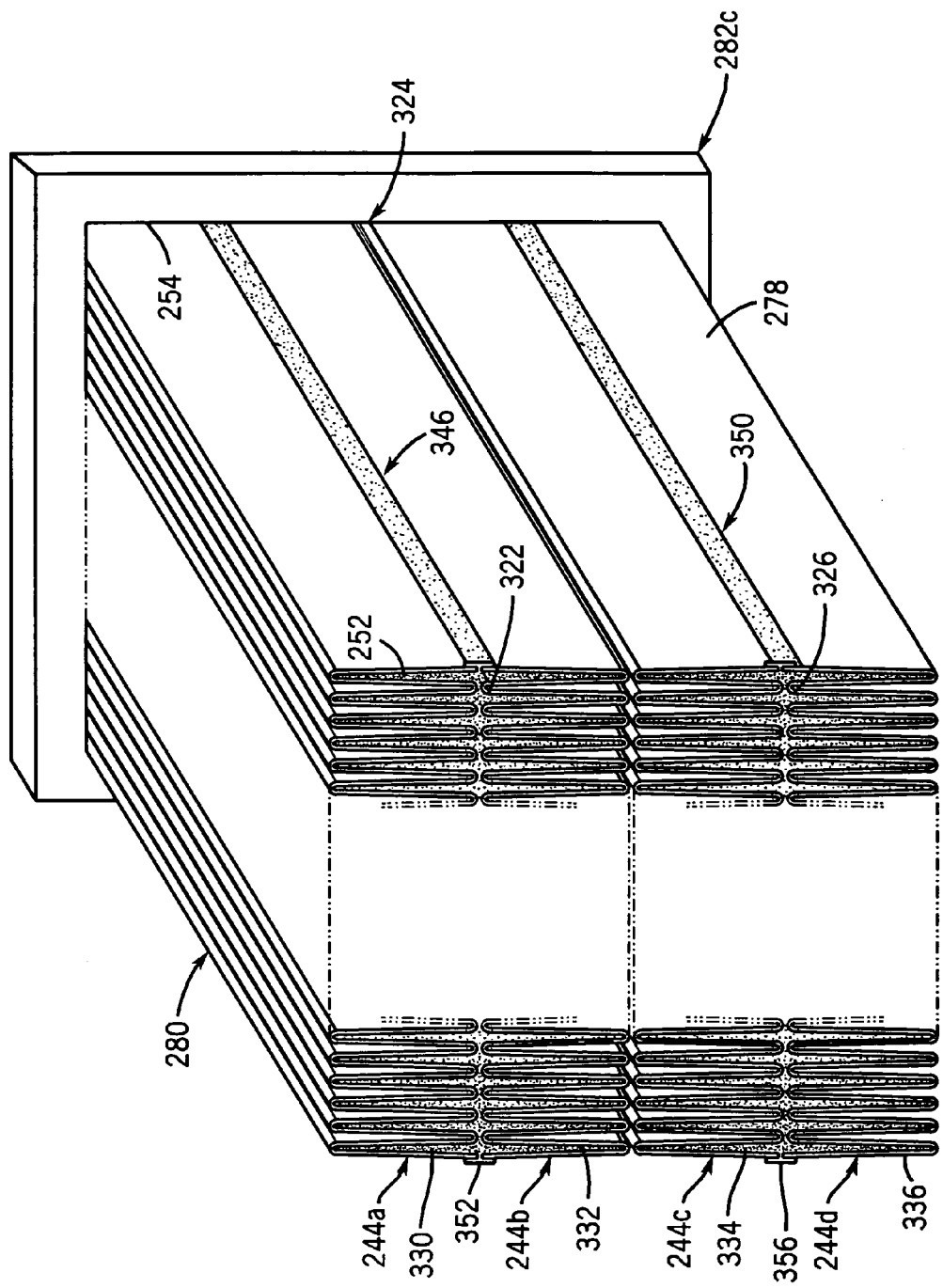
Figures 31, 32:
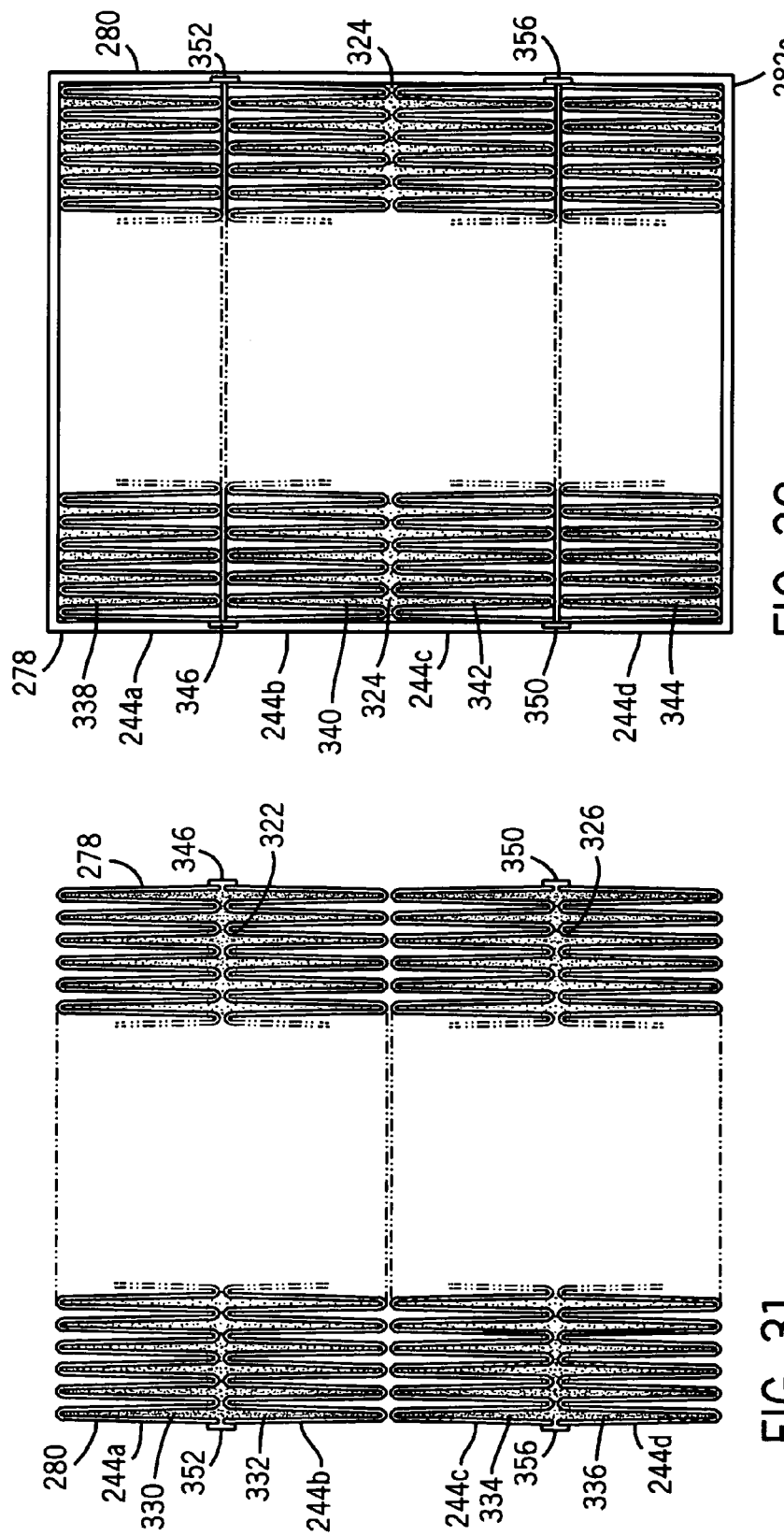

As shown in FIGS. 30 and 31, the closed upstream ends of the noted second set of flow channels are closed by sealing material such as 330 at filter element 244a, 332 at filter element 244b, 334 at filter element 244c, 336 at filter element 244d. The closed downstream ends of the first set of flow channels are closed by sealing material such as 338, FIG. 32, at filter element 244a, 340 at filter element 244b, 342 at filter element 244c, 344 at filter element 244d. Lateral sealing strip 322, FIGS. 30, 31, is sealed to the sealing material 330 in the closed upstream ends of the flow channels of filter element 244a thereabove and is sealed to sealing material 332 in the closed upstream ends of the flow channels of filter element 244b therebelow. Lateral strip 322 may be adhesively bonded to sealing material 330, 332, or may be integrally formed therewith as in a hot melt application, or the like. Lateral strip 326 is sealed to sealing material 334 in the closed upstream ends of the flow channels of filter element 244c thereabove and is sealed to the closed upstream ends of the flow channels of filter element 244d therebelow. Lateral sealing strip 324, FIG. 32, is sealed to sealing material 340 in the closed downstream ends of the flow channels of filter element 244b thereabove and is sealed to sealing material 342 in the closed downstream ends of the flow channels of filter element 244c therebelow. The described sealing protects the downstream, clean areas of the filter from the upstream, dirty areas of the filter.

In FIGS. 26–32, the noted sealing layers are also provided by a right set of axially extending side edge layers 346, 348, 350, etc., FIGS. 26, 29, 20, 3–31, and a left set of axially extending side edge layers 352, 354, 356, etc. Each side edge layer of the right set extends axially from upstream end 252 to downstream end 254 and engages the right side of the filter element thereabove and the right side of the filter element therebelow such that the right side of the filter element is sealed to the right side of the filter element thereabove and to the right side of the filter element therebelow. Each side edge layer of the left set extends axially from upstream end 252 to downstream end 254 and engages the left side of the filter element thereabove and the left side of the filter element therebelow such that the left side of the filter element is sealed to the left side of the filter element thereabove and to the left side of the filter element therebelow. Side edge layers 348 and 354 are optional because of the sealing provided by downstream lateral sealing strip layer 324. FIGS. 30 and 31 show deletion of side edge layers 348 and 354. The noted lateral strip layers and side edge layers protect upstream and clean areas of the filter are from the downstream and dirty areas of the filter. The noted strip layers and edge layers are preferably provided by adhesive such as hot melt, though other types of sealing strips may be used.

PRESENT INVENTION

Figure 33:
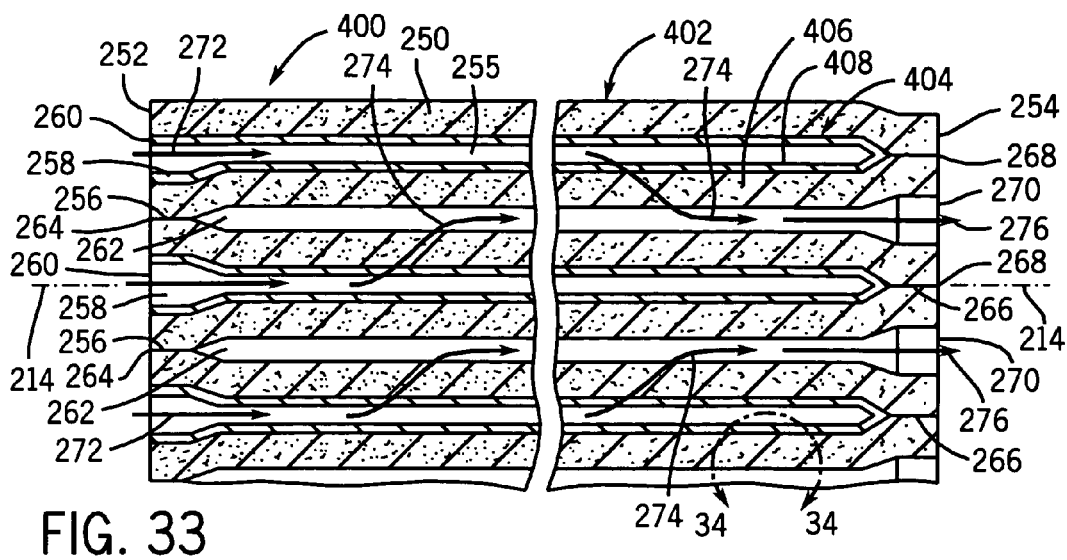
FIG. 33 is a sectional view like FIG. 19 and illustrates the present invention.
Figure 34:
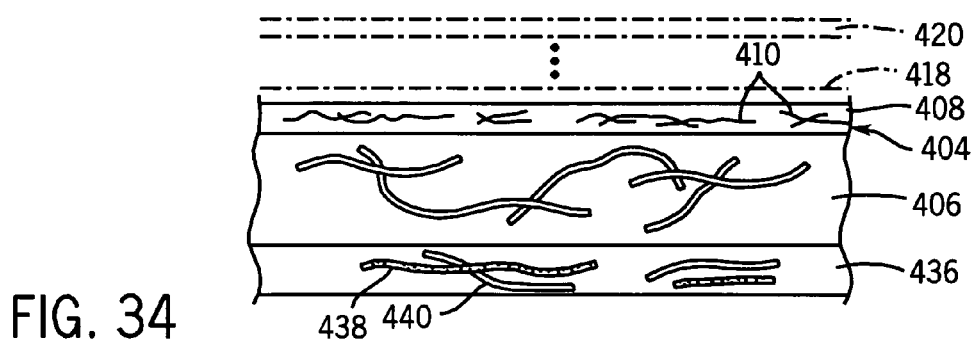
FIG. 34 is an enlarged view of section 34—34 of FIG. 33.

FIG. 33 is like FIG. 19 and uses like reference numerals where appropriate to facilitate understanding. The direct flow filter 400 includes filter element 402 provided by pleated sheet 404 having pleated first and second subsheets 406 and 408 each pleated along the noted bend lines 246, 248. Pleated subsheet 408 has nanofibers 410, FIG. 34.

Figure 35:
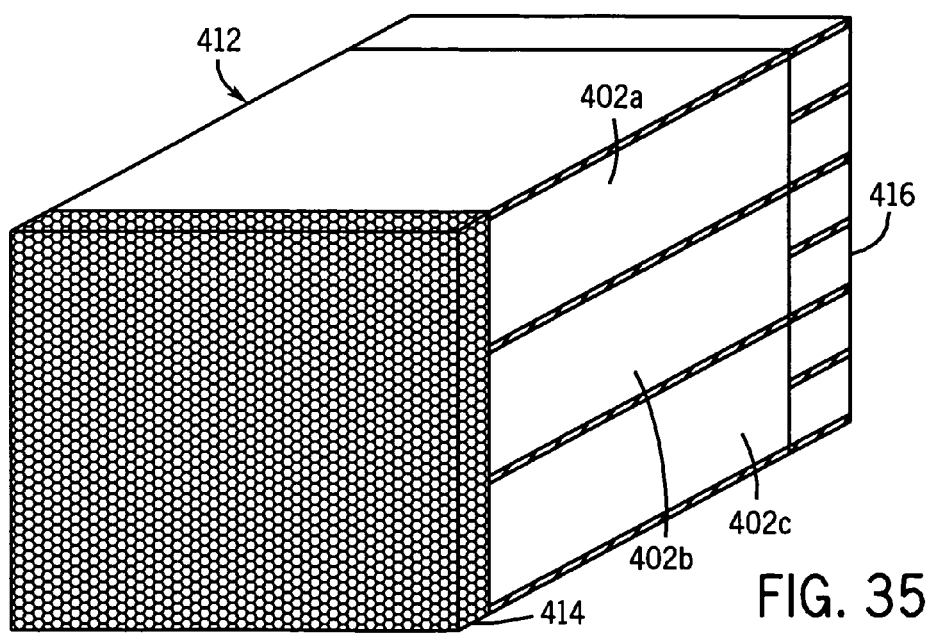
FIG. 35 is perspective view of a filter in accordance with invention.

Referring to FIG. 35, a plurality of filter elements 402a, 402b, 402c, etc., may be stacked on each other, as above, to provide a pleated filter block 412. In one embodiment, a prefilter element 414, which in preferred form is like prefilter element 80, though may have other forms, is provided upstream of pleated filter element block 412, or alternatively upstream of a single pleated filter element 402. Further in such embodiment, a safety filter element 416 is provided downstream of pleated filter element block 412, or alternatively a single pleated filter element 402.

Figure 36:
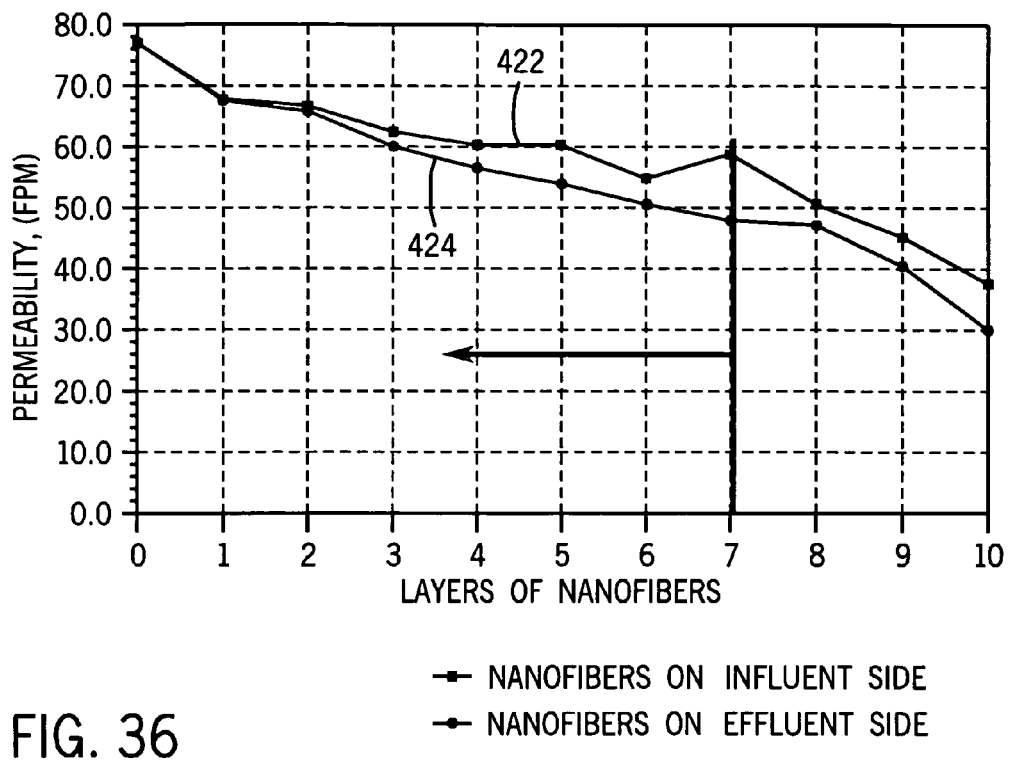
FIG. 36 is a graph showing filter performance.
Figure 37:
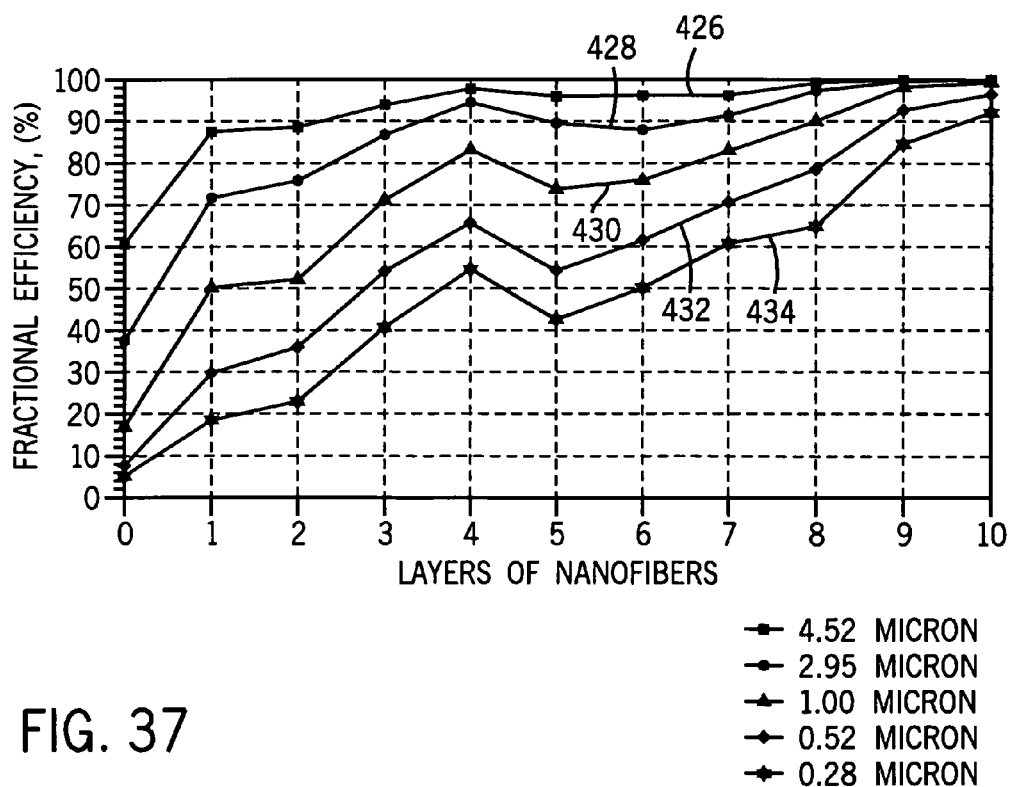
FIG. 37 is a graph showing filter performance.

In a further embodiment, subsheet 408 has a plurality of nanofiber layers 418, etc. through 420, having a cumulative basis weight in the range 0.02 to 0.5 $g/m^2$ (grams per square meter). The number of nanofiber layers is preferably in the range of 4 to 7, the Frazier permeability through the nanofibers layers is greater than or equal to 50 fpm, and the nanofibers in each of the 4 to 7 layers have a fiber diameter in the range 40 to 800 nm. FIG. 36 is a graph plotting permeability in fpm vs. the number of layers of nanofibers. Plot 422 shows the embodiment of FIG. 34 with the nanofibers on the influent side as shown at 408. Plot 424 shows a construction with the nanofibers on the effluent side, for example the lower side in FIG. 34, i.e. the downstream side. As shown in FIG. 36, permeability remains above 50 fpm until the number of nanofiber layers increases above 7. FIG. 37 is a graph plotting fractional efficiency vs. the number of layers of nanofibers on the influent side for various particle sizes ranging from 4.52 microns at plot 426 to 2.95 microns at plot 428 to 1.00 micron at plot 430 to 0.52 micron at plot 432 to 0.28 micron at plot 434. As illustrated, fractional efficiency continues to increase until the number of nanofiber layers reaches 4, whereafter there is either a decrease or the rate of increase is not as steep, particularly beyond 7 layers of nanofibers.

In a further embodiment, another sheet 436 is provided in combination with sheet 404, preferably downstream thereof, and having tribologically different fibers 438 and 440 providing a triboelectric effect. In a further embodiment, sheet 408 has tribologically different nanofibers providing a triboelectric effect. In the embodiments of FIGS. 14–17 and 33–35, the nanofibers may be provided in separate layers or may be incorporated and integrated into the respective pleated main filter element layer, and furthermore the nanofibers may be provided by first and second sets of nanofibers having tribologically different nanofibers providing a triboelectric effect.

It is recognized that various equivalents, alternatives and modifications are possible within the scope of the appended claims.

What is claimed is:

1. A multi-stage filter comprising an upstream prefilter element and a downstream main filter element, one of said elements including nanofibers, wherein said downstream main filter element has said nanofibers, and wherein said nanofibers have: a) a fiber diameter in the range 40 to 800 nm (nanometers); and b) a basis weight in the range 0.02 to 1.0 $g/m^2$ (grams per square meter), wherein said main filter element comprises three sets of fibers, namely a first set comprising said nanofibers, and second and third sets of tribologically different fibers providing a triboelectric effect.

2. The multi-stage filter according to claim 1 wherein said main filter element comprises two sheets comprising a pleated first sheet having fibers selected from the group consisting of cellulose fibers and synthetic fibers, and having said nanofibers, and a second sheet having said second and third sets of tribologically different fibers.

3. The multi-stage filter according to claim 2 wherein said first sheet is between said pre-filter element and said second sheet.

4. The multi-stage filter according to claim 2 wherein said first sheet comprises pleated first and second subsheets, said first subsheet having said fibers selected from said group consisting of cellulose fibers and synthetic fibers, said second subsheet having said nanofibers.

5. A multi-stage filter comprising an upstream prefilter element and a downstream main filter element, one of said elements including nanofibers wherein said downstream main filter element has said nanofibers, and wherein said nanofibers have: a) a fiber diameter in the range 40 to 800 nm (nanometers); and b) a basis weight in the range 0.02 to 1.0 g/m² (grams per square meter), and comprising first and second sets of said nanofibers, said first and second sets having tribologically different nanofibers providing a triboelectric effect.

6. A multi-stage filter comprising an upstream prefilter element and a downstream main filter element, one of said elements including nanofibers, wherein said downstream main filter element has said nanofibers, and wherein said nanofibers have: a) a fiber diameter in the range 40 to 800 nm (nanometers); and b) a basis weight in the range 0.02 to 1.0 g/m² (grams per square meter), wherein said main filter element comprises four sets of fibers, namely a first set comprising said nanofibers, second and third sets of tribologically different fibers providing a triboelectric effect, and a fourth set of fibers selected from the group consisting of cellulose fibers and synthetic fibers and having a fiber diameter substantially greater than said nanofibers.

* * * * *